(12) United States Patent
den Boer et al.

(10) Patent No.: US 6,243,062 B1
(45) Date of Patent: Jun. 5, 2001

(54) METHOD AND SYSTEM FOR ADDRESSING LCD INCLUDING THIN FILM DIODES

(75) Inventors: Willem den Boer; Yair Baron, both of Plymouth, MI (US)

(73) Assignee: OIS Optical Imaging Systems, Inc.

( * ) Notice: Subject to any disclaimer, the term of this patent is extended or adjusted under 35 U.S.C. 154(b) by 0 days.

(21) Appl. No.: 09/035,819

(22) Filed: Mar. 6, 1998

Related U.S. Application Data

(63) Continuation-in-part of application No. 08/935,678, filed on Sep. 23, 1997.

(51) Int. Cl.$^7$ .................................................. G09G 3/36
(52) U.S. Cl. ........................................... 345/91; 345/96
(58) Field of Search ................................. 345/96, 87, 91, 345/210

(56) References Cited

U.S. PATENT DOCUMENTS

| | | |
|---|---|---|
| 4,731,610 | 3/1988 | Baron et al. . |
| 5,142,390 | 8/1992 | Ohta et al. . |
| 5,576,728 | 11/1996 | Maeda . |
| 5,883,686 * | 3/1999 | Leehouts et al. ............... 349/177 |
| 5,892,493 * | 4/1999 | Enami et al. ..................... 345/94 |

FOREIGN PATENT DOCUMENTS

| | | |
|---|---|---|
| 0217466 | 4/1987 | (EP) . |
| 0434627 | 6/1991 | (EP) . |
| 0447077 | 9/1991 | (EP) . |
| 0475770 | 3/1992 | (EP) . |
| 0910062 | 4/1999 | (EP) . |
| 2605778 | 4/1988 | (FR) . |
| 2217891 | 11/1989 | (GB) . |

OTHER PUBLICATIONS

"A Two–Diode Pixel Circuit and Addressing Method for MIM LCDs" By Willem den Boer, Proceedings Eurodisplay '96, Oct . 1996.

* cited by examiner

*Primary Examiner*—Steven Saras
*Assistant Examiner*—Alecia D. Nelson
(74) *Attorney, Agent, or Firm*—Laff, Whitesel & Saret, Ltd.

(57) ABSTRACT

A system and method for driving a thin film diode (TFD) inclusive AMLCD or imaging device (e.g. x-ray imager) includes providing each pixel with a pair of select lines and a single data line. Drive schemes are provided which increase the circuits tolerance for spacial and temporal variations in diode (e.g. MIM diode) characteristics, improve response time, increase the circuit's tolerance for RC delays on data lines, and reduces the potential for crosstalk or image retention. In certain embodiments, where each pixel includes a pair of select lines, and a single data line, the select voltage on the first select line alternates between $V_S+V_{offset}$ and $V_S-V_{offset}$ for subsequent frames, while the select voltage on the other select line alternates between $-V_S+V_{offset}$ and $-V_S-V_{offset}$ for subsequent frames, thereby allowing voltage at the common node to be added to the data voltage. Drive schemes herein are used in conjunction with row inversion driving of pixel arrays, and some embodiments are also compatible with column inversion, frame inversion, and/or pixel inversion.

17 Claims, 17 Drawing Sheets

Frame #1

|   | 1 | 2 | 3 | 4 |
|---|---|---|---|---|
| 1 | + | + | + | + |
| 2 | + | + | + | + |
| 3 | + | + | + | + |
| 4 | + | + | + | + |

Frame #2

|   | 1 | 2 | 3 | 4 |
|---|---|---|---|---|
| 1 | − | − | − | − |
| 2 | − | − | − | − |
| 3 | − | − | − | − |
| 4 | − | − | − | − |

FIG. 7

Frame #1

|   | 1 | 2 | 3 | 4 |
|---|---|---|---|---|
| 1 | + | + | + | + |
| 2 | − | − | − | − |
| 3 | + | + | + | + |
| 4 | − | − | − | − |

Frame #2

|   | 1 | 2 | 3 | 4 |
|---|---|---|---|---|
| 1 | − | − | − | − |
| 2 | + | + | + | + |
| 3 | − | − | − | − |
| 4 | + | + | + | + |

FIG. 8

Frame #1

|   | 1 | 2 | 3 | 4 |
|---|---|---|---|---|
| 1 | + | − | + | − |
| 2 | + | − | + | − |
| 3 | + | − | + | − |
| 4 | + | − | + | − |

Frame #2

|   | 1 | 2 | 3 | 4 |
|---|---|---|---|---|
| 1 | − | + | − | + |
| 2 | − | + | − | + |
| 3 | − | + | − | + |
| 4 | − | + | − | + |

FIG. 9

Frame #1

|   | 1 | 2 | 3 | 4 |
|---|---|---|---|---|
| 1 | + | − | + | − |
| 2 | − | + | − | + |
| 3 | + | − | + | − |
| 4 | − | + | − | + |

Frame #2

|   | 1 | 2 | 3 | 4 |
|---|---|---|---|---|
| 1 | − | + | − | + |
| 2 | + | − | + | − |
| 3 | − | + | − | + |
| 4 | + | − | + | − |

FIG. 10

Circuit for 2400 pixel row in Single MIM LCD

Circuit for 2400 pixel row in Dual MIM LCD

High Voltage (Full Range) Source Driver:

Low Voltage (5 Volt) Driver:

METHOD AND SYSTEM FOR ADDRESSING LCD INCLUDING THIN FILM DIODES

This application is a continuation in part (CIP) of U.S. Ser. No. 08/935,678, filed Sep. 23, 1997, the disclosure of which is incorporated herein by reference.

METHOD AND SYSTEM FOR ADDRESSING LCD INCLUDING THIN FILM DIODES

This invention relates to a system and method for driving an electronic matrix array of elements, such as an active matrix liquid crystal display (AMLCD). More particularly, this invention relates to a method and system for addressing a diode driven matrix array, such as an LCD, including two select address lines per row.

The diodes are preferably of the thin film diode (TFD) type, and may be metal-insulator-metal (MIM) diodes in certain embodiments.

BACKGROUND OF THE INVENTION

In known electronic matrix systems, an array of storage elements, each having a unique address, is utilized for storing electric charge and can include, for example, memory arrays and/or LCDs. In LCDs, the storage elements take the form of picture elements or pixels. The pixels generally include a pair of spaced apart electrodes having liquid crystal material disposed therebetween. Thus, each pixel constitutes a capacitor in which electric charge can be stored. The charge stored in a pixel results in a voltage potential across the opposing electrodes and an electric field across the liquid crystal material. By controlling the amount of charge stored in pixels across the array, the properties of the liquid crystal (LC) material can be controlled to obtain a desired light influencing effect or image which is displayed to a viewer.

In LCDs, alignment of the LC molecules can be obtained when the electric field applied to the LC is above a threshold value. When this occurs, a pixel becomes light transmissive or light absorbing, depending upon the relative alignment of the display's polarizers and alignment layers; when the field is below the threshold value, an opposite effect is obtained.

In LCDs, it is necessary to update the condition of each pixel at regular intervals, i.e. at a given frame rate. This is required because the pixels can retain or store the applied charge potentials for only a finite time. Updating is further required in order to change the image to be displayed (e.g. when the image is changing or moving). Accordingly, the ability to rapidly transfer to, and store electric charge in, pixels and to efficiently retain the stored charge therein for a frame period is essential.

U.S. Pat. No. 4,731,610 (to co-inventor Baron herein) discloses a driving scheme which utilizes, for example, either field effect transistors (FETs) or PIN (p doped-intrinsic-n doped) diodes. Unfortunately, these types of switching devices (PIN diodes and FETs), when employed in LCDs, require an undesirably high number of mask steps for fabrication, and also require a high degree of critical alignment. Accordingly, these complex structures reduce the yield of usable components per fabrication run, and therefore increase production costs.

Metal-insulator-metal (MIM) diode LCDs are easier to fabricate than FET/TFT LCDs and conventional diode LCDs. A typical MIM electronic matrix array requires between two and four thin film layers and photomask steps, as compared to 6–9 thin film layers and photomask steps for TFT arrays. Patterning of most MIM arrays can be achieved with less stringent overlay accuracy and resolution requirements, then is required for TFT arrays. As a result, less expensive photo-exposure equipment, such as scanning projection aligners, can be used, that have more than twice the throughput and cost less than half as much as flat panel steppers.

Despite their lower production costs, MIM driven LCDs are not widely used. This can be attributed to the inferior performance of typical MIM LCDs with regard to gray shade control, image retention, response time, and maximum size and resolution as compared to TFT LCDs. Accordingly, there exists a need in the art for an improved MIM LCD drive scheme, which is cheaper to manufacture, less susceptible to image retention and gray scale problems, and has good resolution.

European Patent Application 0 434 627 A2 discloses a MIM diode driven LCD, invented previously by Inventor Willem den Boer of the instant application. In the EP '627 application, the MIM diode driven LCD includes two select lines per row, and a corresponding column line for each column. Thus, each individual pixel is addressed by a single column line and a pair of select or row lines. First and second MIM diodes are utilized to address each pixel, with a one MIM per branch design being utilized (i.e. there is only a single MIM diode between the common node and each select line). Unfortunately, the drive scheme of the '627 application suffers from at least the following problems. Firstly, as shown in FIG. 3 of the '627 application, the polarity of signal on each select line is always reversed, with the reversal interval being two frames. Thus, for example, the pulses on a given select line will be positive for two frames, and then switch to a negative polarity for the next two frames, and so on. This requires sophisticated and expensive electronics which are undesirable. Secondly, the single MIM per branch design in the '627 application can result in a non-symmetric device, which requires the polarity changes discussed above. Thirdly, as shown in FIG. 3(a) of the '627 application, for example, a large number of separate voltage levels (or holding voltage levels) are required in this design. This also is expensive, and requires complex circuitry which is undesirable.

Fourthly, as shown in FIG. 3(a) of the '627 application, for example, the voltage swing is 34 volts. This is so large, so as to require complex and expensive drive circuitry.

A fundamental desire in LCD driving schemes, is to reduce the complexity and costs of drive circuitry, which is always a cost sensitive component to be taken into consideration.

U.S. Pat. No. 5,576,728 to Maeda discloses a dual MIM circuit. Unfortunately, the MIM circuit of the '728 patent relate to "frame" inversion (e.g. see FIG. 7 herein). Frame inversion is undesirable in that it leads to top-to-bottom shading, cross-talk, and flicker in display operation and is therefor almost never used for display applications. Row inversion or pixel inversion are instead typically used in LCD applications.

In the '728 patent, a reduction of pixel voltage variation across the display (shading) from 0.5 V to 0.1 V is described as a benefit of the proposed '728 patent drive scheme. The reduction is allegedly achieved because the total swing of the data voltage and therefore cross talk is reduced by using an offset voltage on the select or non-select voltage. This allows the use of a low voltage column driver with bipolar video.

It has been found by the instant inventors that the shading described in the Maeda '728 patent can only be completely eliminated by row inversion or pixel inversion (which are much different than Maeda's frame inversion), in which cross talk from the data voltage is substantially canceled out for most image patterns. In Maeda, the select voltages on positive and negative select lines are kept constant for all pixels on all rows during one scan interval. Also in Maeda, the bipolar video occurs around a non-zero offset voltage that stays constant during the entire scan interval, and this can only be done for frame inversion. Other schemes in Maeda '728 are also only compatible with frame inversion and are therefore useless in all practicality. Some other Maeda schemes use an offset on the non-select bias. However, because this offset is the same for all rows and changes polarity at the end of the scan interval, it is not a true holding voltage that is continuously maintained until the same row is selected again. The offset is thus only compatible with frame inversion and will continue to cause shading and flicker problems. Thus, Maeda is incompatible with desirable row and pixel inversions.

It is apparent from the above that there exists a need in the art for an improved MIM diode driven LCD or other electronic matrix array, which (i) is designed so as to require less complex and less expensive circuitry; (ii) has improved gray shade control; (iii) is less sensitive to image retention than previous MIM LCDs and has had good resolution characteristics; and (iv) is capable of being used with row inversion systems that are commonly used in LCDs and the like.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a method of addressing a liquid crystal display including metal-insulator-metal (MIM) diodes, the method comprising the steps of:

providing a plurality of pixels in the display, each of the pixels including a liquid crystal layer and a pair of electrodes which form a capacitor;

providing each pixel with first and second MIM diodes that are coupled via a common node, the common node being located between (a) the MIM diodes, and (b) the capacitor;

providing each pixel with first and second select address lines, the first select address line being coupled to the first MIM diode and the second select address line being coupled to the second MIM diode;

providing each pixel with a data address line;

in a pixel, biasing the first and second MIM diodes into and on condition to facilitate storage of charge in the capacitor of the pixel by varying a select voltage applied to the first select address line between $V_S+V_{offset}$ and $V_S-V_{offset}$ for subsequent frames, and varying a select voltage applied to the second select address line between $-V_S+V_{offset}$ and $-V_S-V_{offset}$ for subsequent frames, wherein $V_S$ is one voltage and $V_{offset}$ is another voltage that is less than $V_S$.

This invention will now be described with reference to certain embodiments thereof as illustrated in the following drawings.

IN THE DRAWINGS

Figure 7:
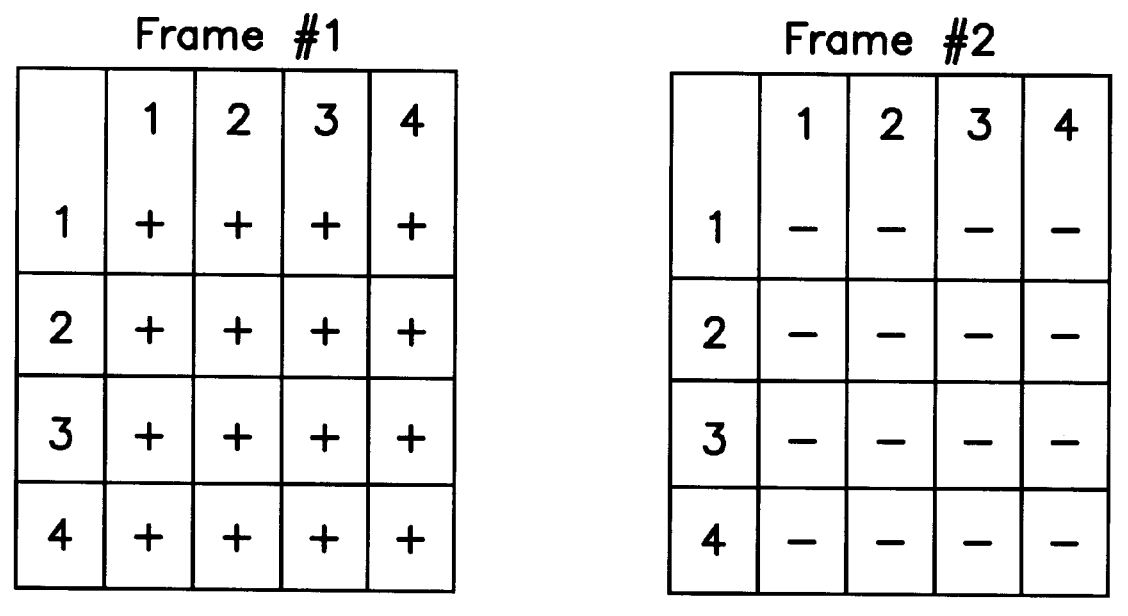

FIG. 7 are a pair of graphs illustrating row inversion as discussed herein. The "+" and "−" signs in the FIG. 7 graphs (and also in the FIGS. 8–10 graphs) represent, with the display operating in AC, the polarity of the voltage at the pixel node V with respect to the voltage on the opposite electrode (made up of patterned columns of ITO to which the data is applied) across the LC layer. Thus, if the voltage at pixel node V is +5 volts and the voltage on the opposite pixel electrode across the LC layer is 0 volts, then a "+" sign would be used in FIG. 7 (although the V does not remain constant during each frame as it floats, except during select periods). In the same frame, when the voltage on the opposite pixel electrode goes to +5 volts, then the voltage at the pixel node V would go to +10 volts, so that the relative voltage remains substantially constant throughout the entire frame. If the column voltage on the opposite pixel electrode went to −5 volts, then the node voltage would go to 0 volts. In all of these cases, the "+" sign is proper as it describes the polarity of the node voltage "relative" to the opposite electrode voltage. Thus, the "+" and "−" signs in FIGS. 7–10 describe the voltage across the liquid crystal material, in each individual pixel.

FIG. 8 are a pair of graphs illustrating row inversion useful with embodiments of this invention, herein each row of pixels in the display has a given polarity in each frame, with the next row having the opposite polarity, and wherein polarity for each row of pixels changes for the next frame.

FIG. 9 are a pair of graphs illustrating column inversion, where column inversion is the same as row inversion, except that each column of pixels has its own polarity in a given frame and then changes polarity for the next frame.

FIG. 10 are a pair of graphs illustrating dot(pixel) inversion from one display frame to the next.

Figure 11:
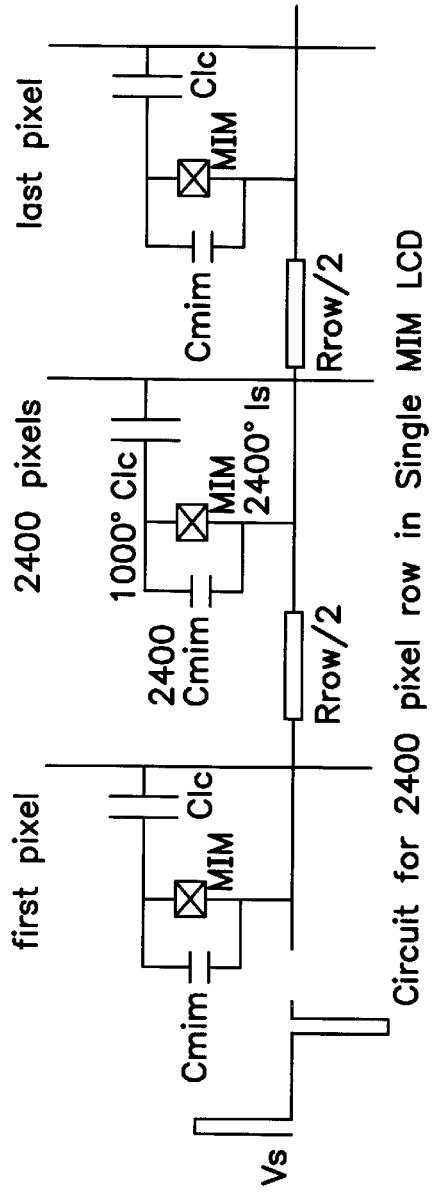

FIG. 11 is a schematic Pspice simulation circuit for one row in a 28 in. SVGA single MIM LCD configuration for comparison with dual MIM designs of this invention. "Pspice" is simulation software, available from MicroSim, of California, for simulating circuits.

Figure 12:
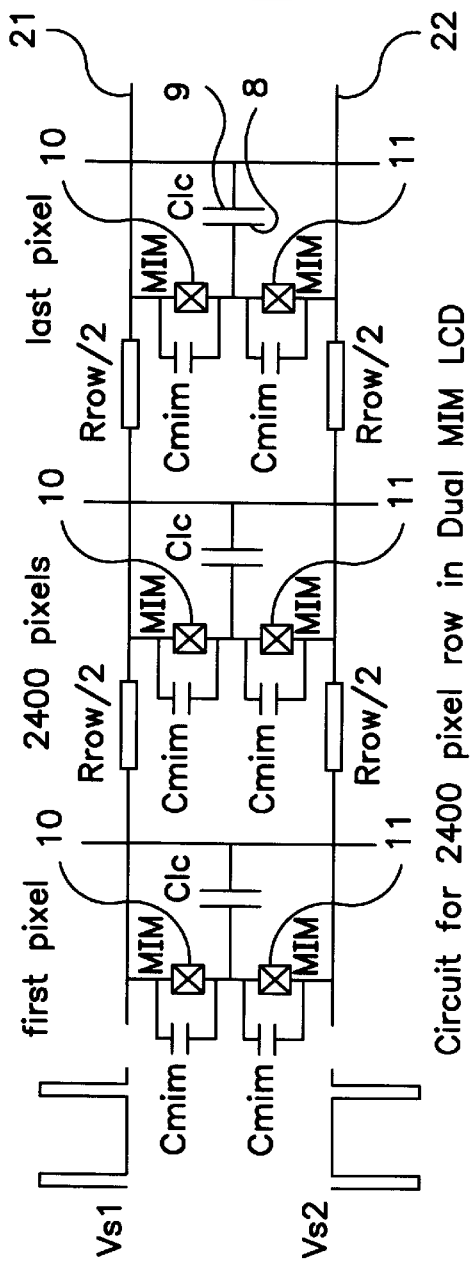

FIG. 12 is a schematic Pspice simulation circuit for one row in 28 in. SVGA dual MIM LCD in accordance with certain embodiments of this invention.

Figure 13:
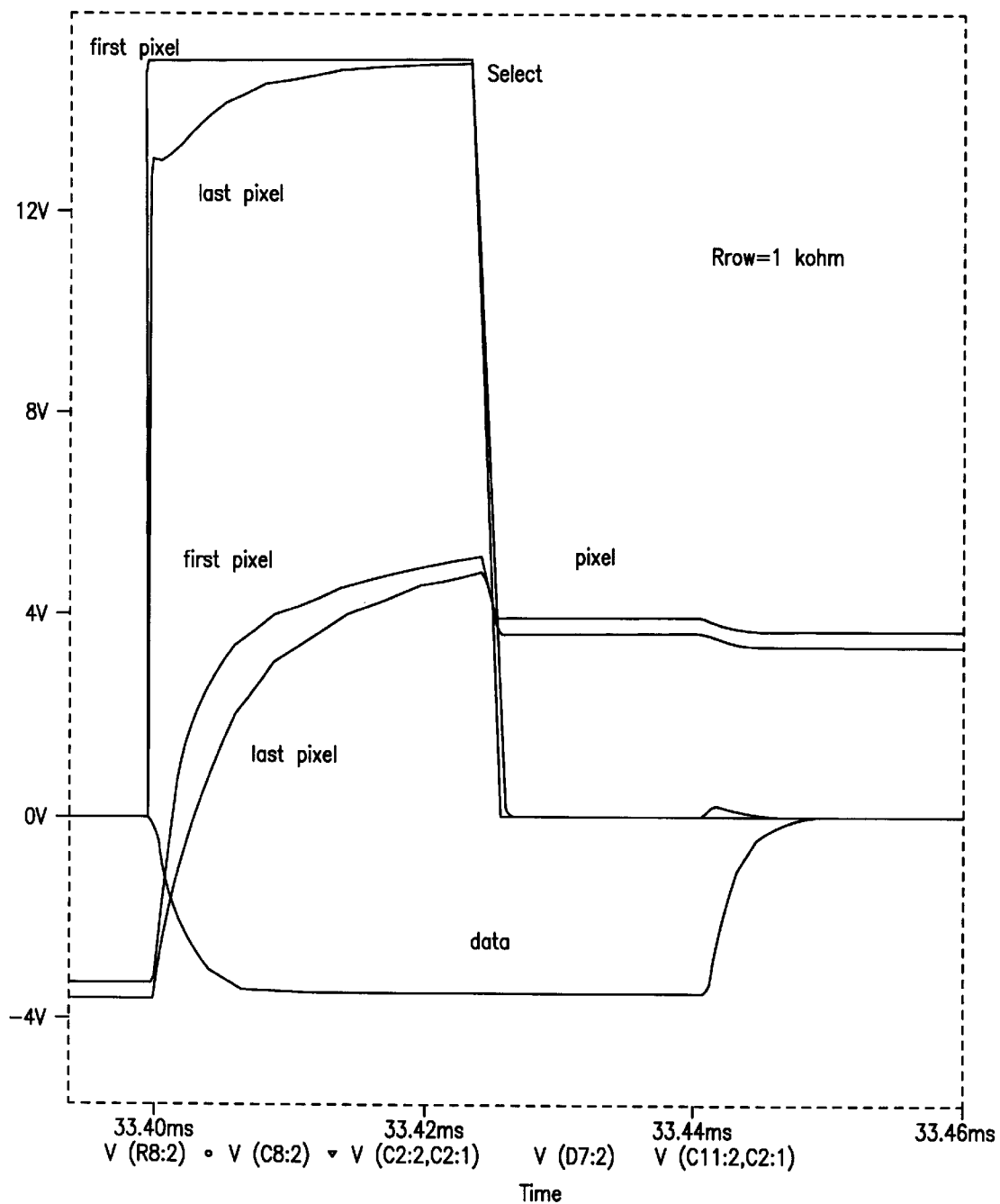

FIG. 13 is a time versus voltage graph illustrating pixel voltage and select and data waveforms for the single MIM circuit of FIG. 11 with $R_{ROW}$=1 kohm.

Figure 14:
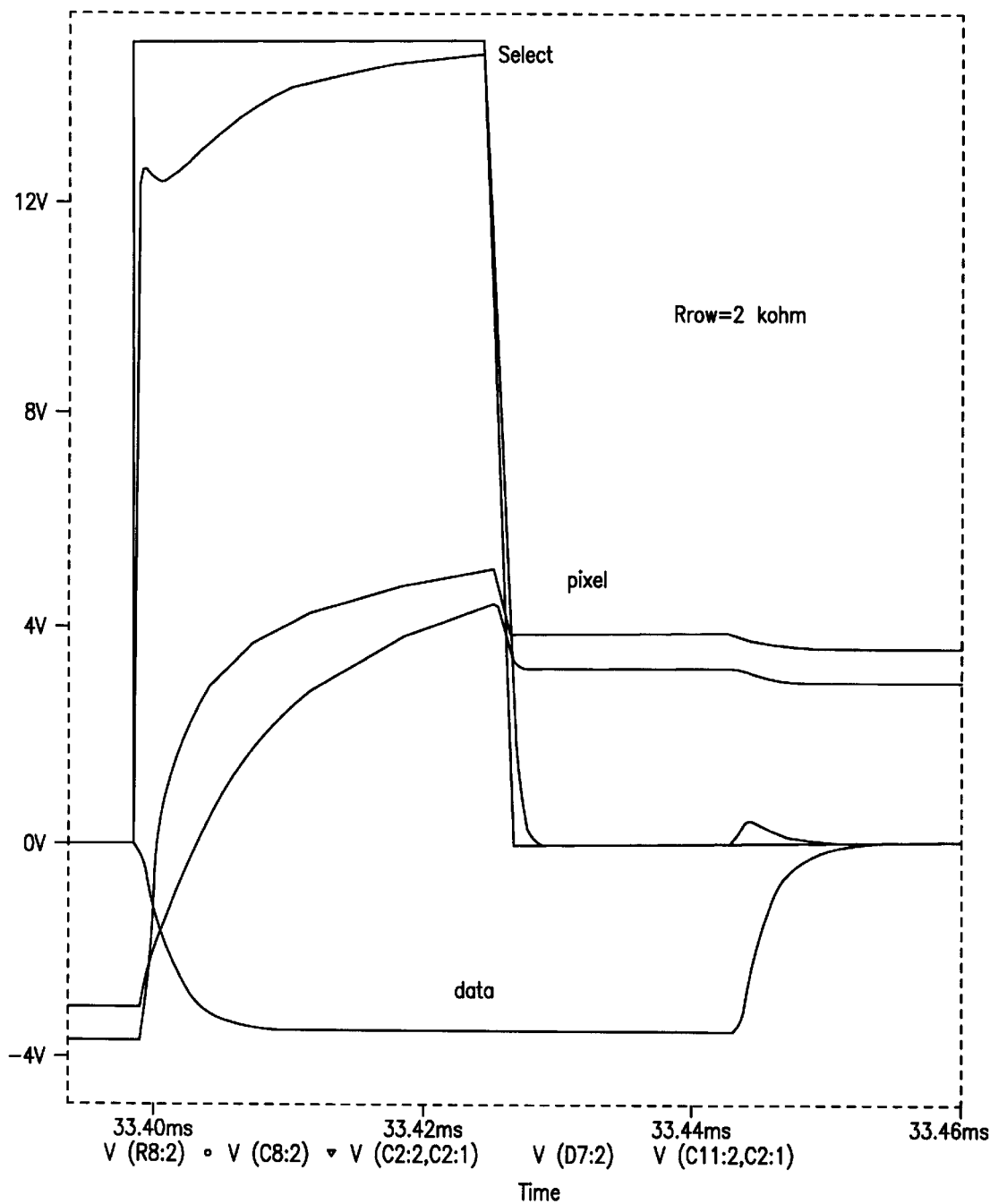

FIG. 14 is a time versus voltage graph illustrating pixel voltage and select and data waveforms for the single MIM circuit of FIG. 11 with $R_{ROW}$=2 kohm.

Figure 15:
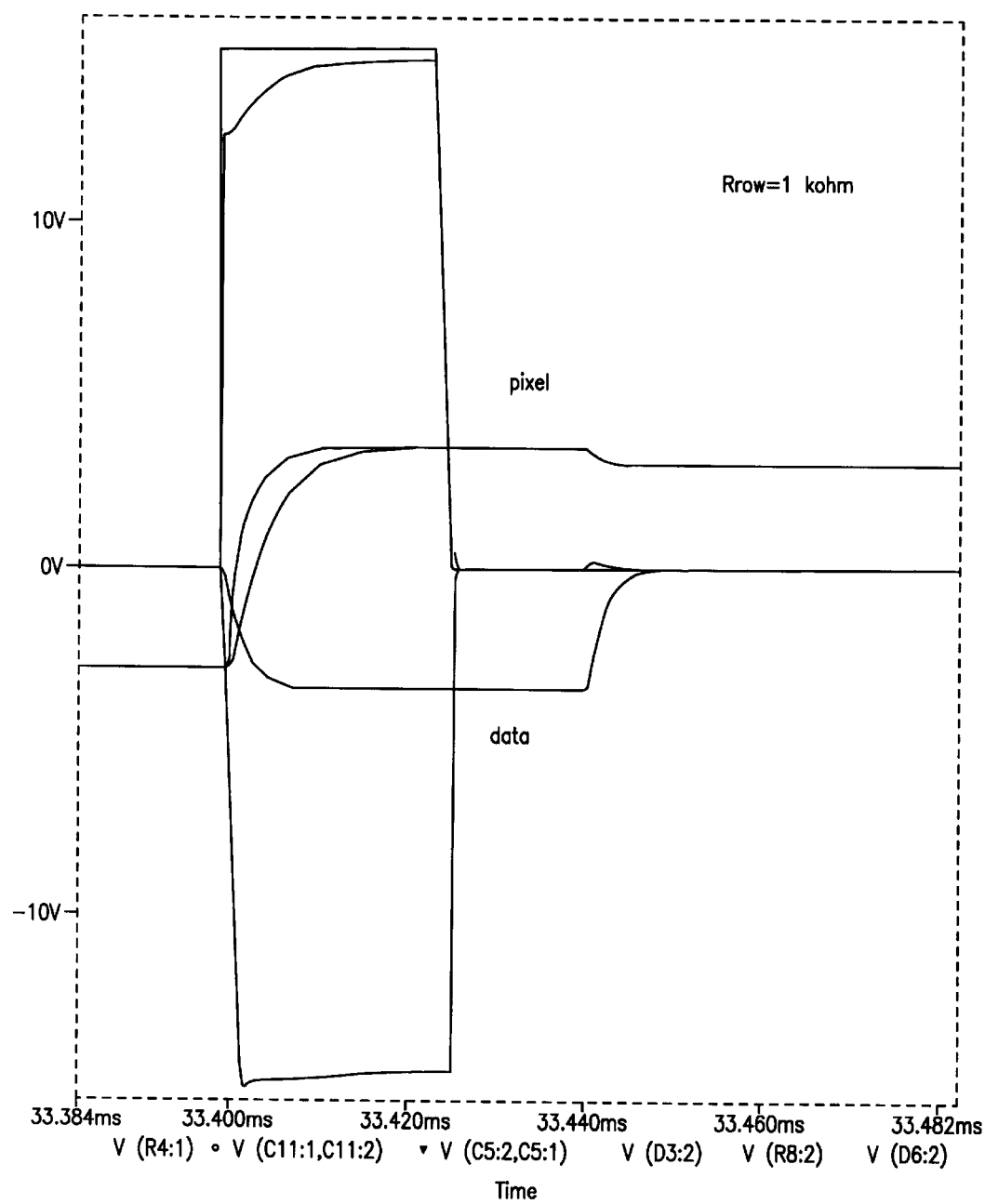

FIG. 15 is a time versus voltage graph of the same FIG. 13 curves, except for a dual MIM circuit of FIG. 12 in accordance with this invention when $R_{ROW}$=1 kohm.

Figure 16:
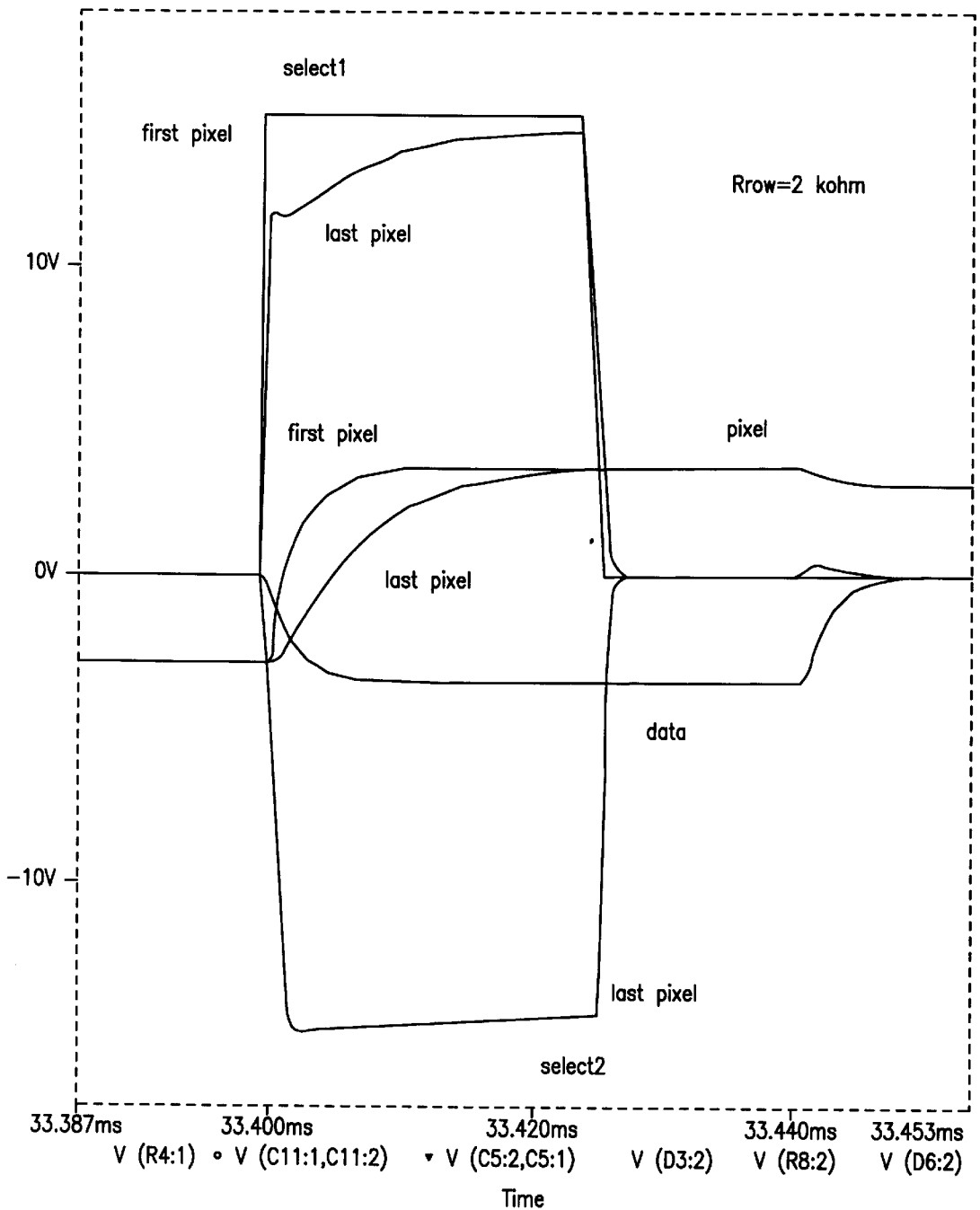

FIG. 16 is a time versus voltage graph of the same FIG. 14 curves, except for a dual MIM circuit of FIG. 12 in accordance with this invention when $R_{ROW}$=2 kohm.

Figure 17:
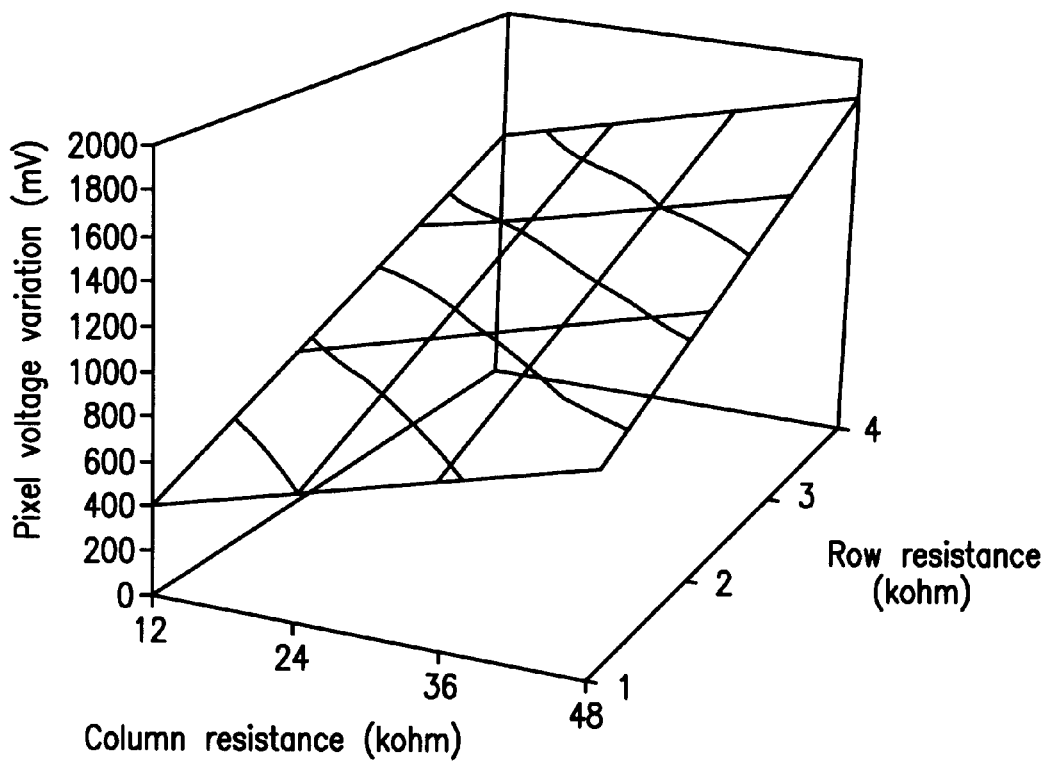

FIG. 17 is a three dimensional graph, illustrating pixel voltage variation (mV) [vertical axis] as a function of both row resistance (kohm) and column resistance (kohm), for the single MIM display of FIGS. 11, 13, and 14. This graph is used for purposes of comparison with the dual MIM graph of FIG. 18.

Figure 18:
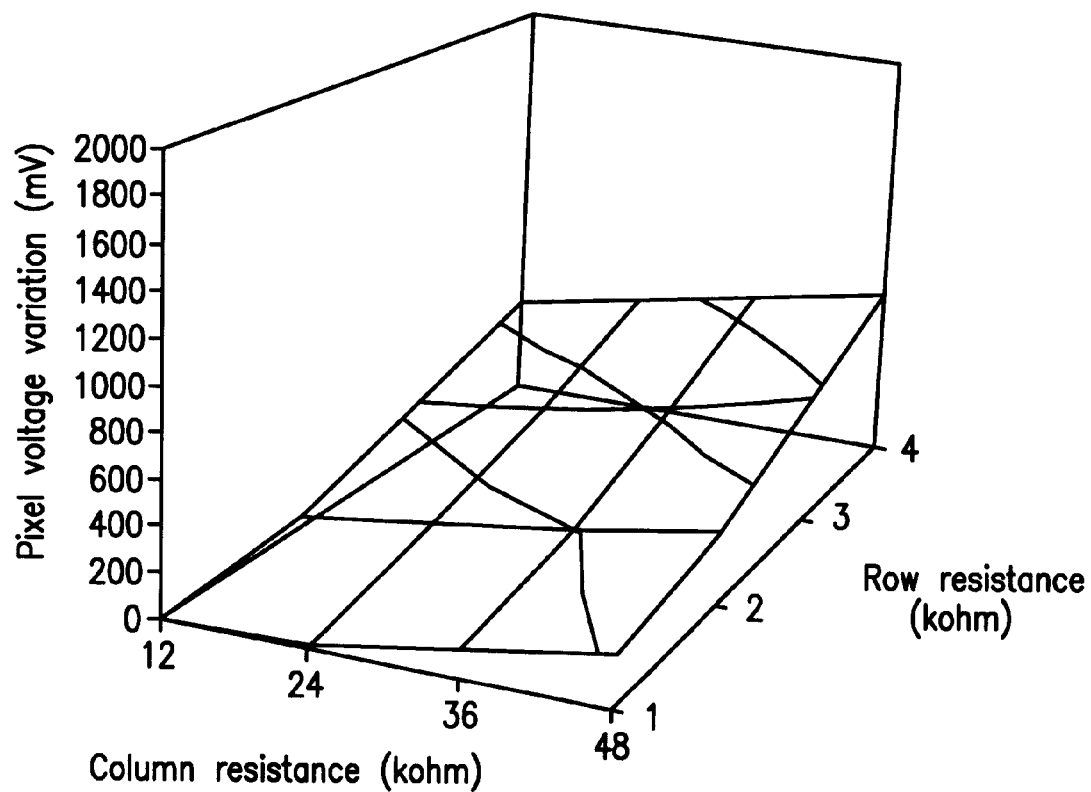

FIG. 18 is a three dimensional graph of the dual MIM circuit of FIGS. 12, 15, and 16, illustrating pixel voltage variation (mV) [vertical axis] as a function of both row resistance (kohm) and column resistance (kohm).

Figure 19:
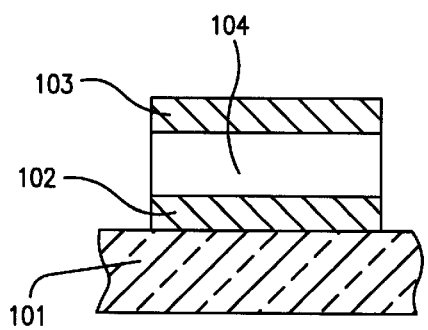
Figure 19A:
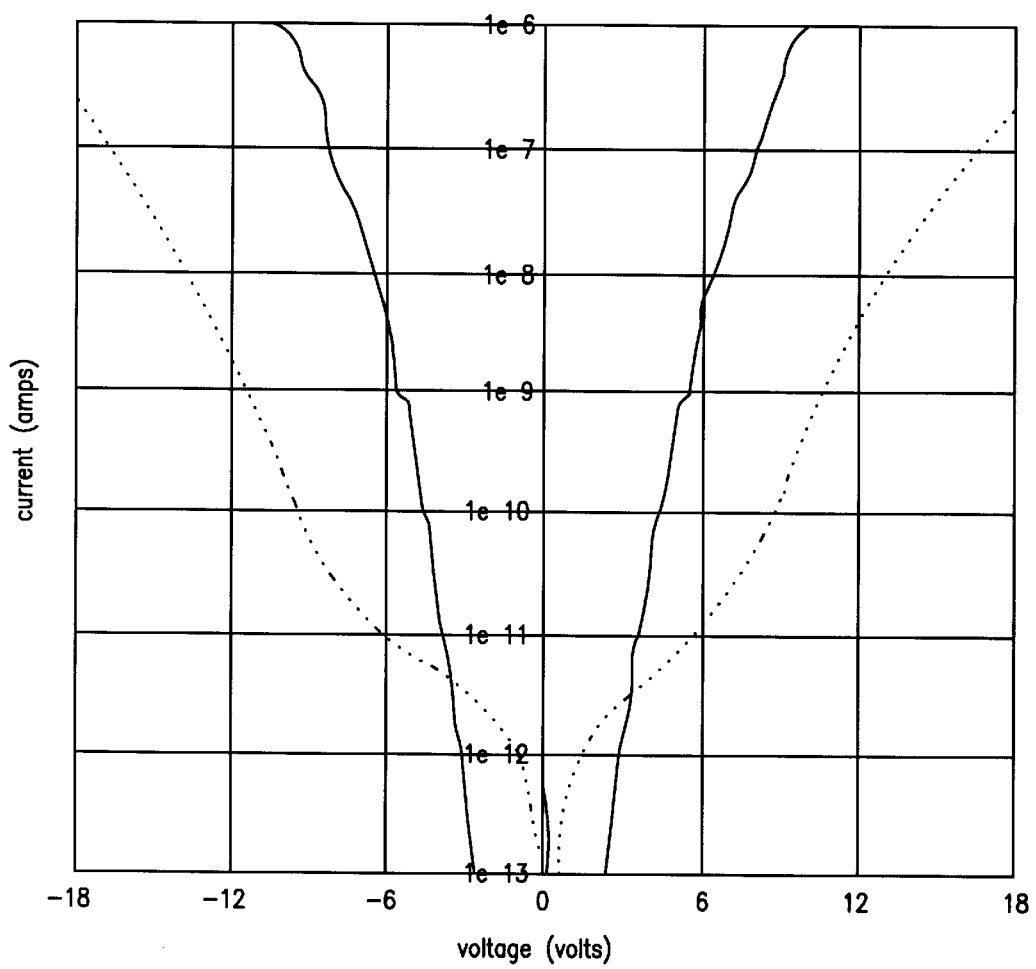

FIG. 19(a) is a voltage (volts) versus current (amps) graph, with characteristics normalized to 30 um×30 um, of a 30×30 MIM diode using amorphous silicon nitride (dotted line) as the insulator and of a similar diamond line carbon insulated MIM device (solid line).

FIG. 19(b) is a side cross sectional view of a MIM diode or a TFD diode in accordance with certain embodiments of this invention.

Figure 20A:
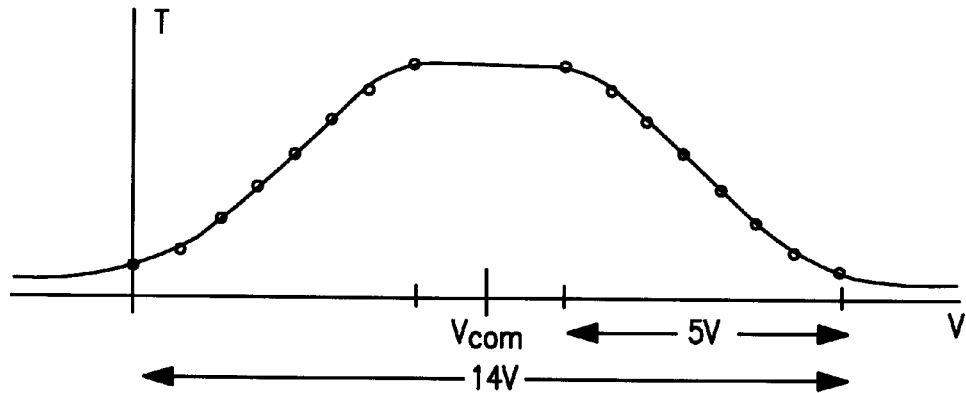

FIG. 20(a) is a graph illustrating center return video driving.

Figure 20B:
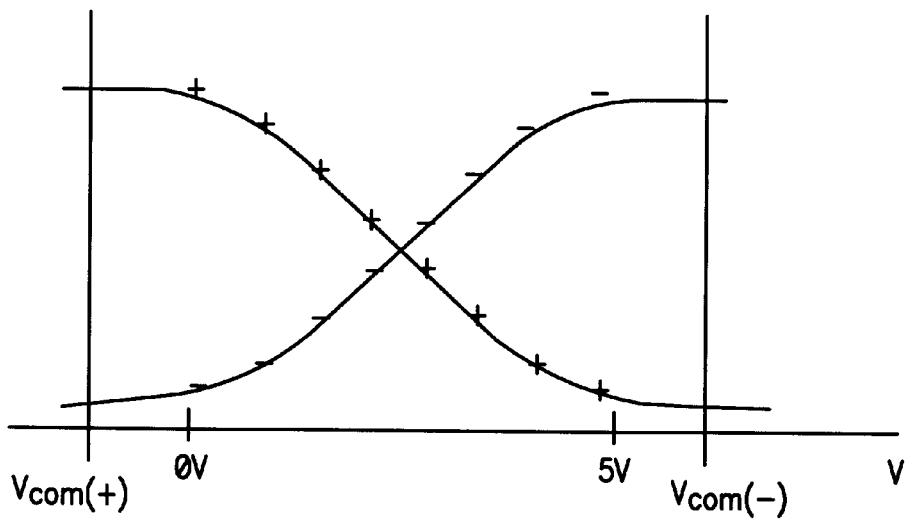

FIG. 20(b) is a graph illustrating bipolar video driving.

DETAILED DESCRIPTION OF CERTAIN EMBODIMENTS OF THIS INVENTION

Referring now more particularly to the accompanying drawings in which like reference numerals indicate like parts throughout the several views.

Figure 1:
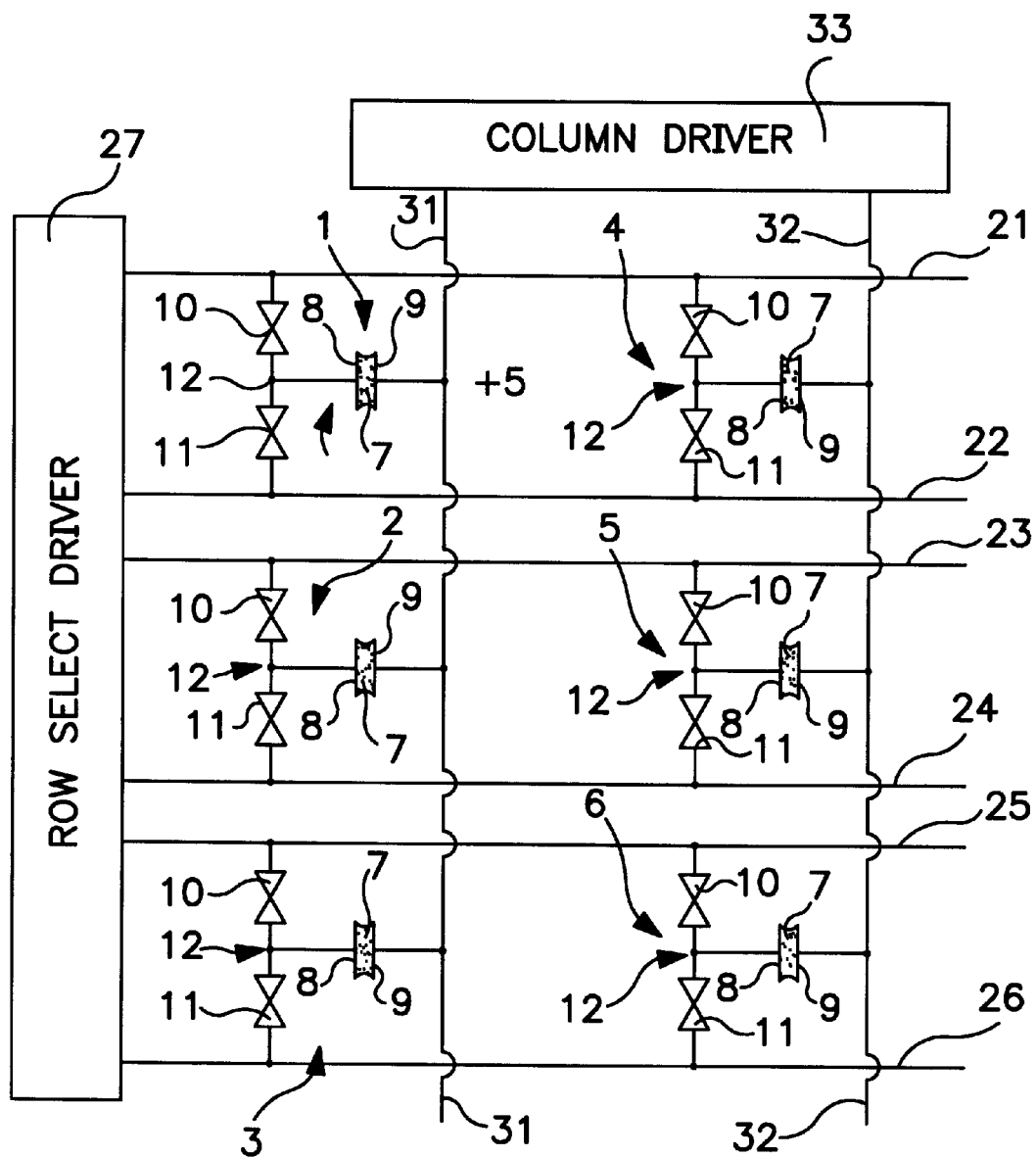
FIG. 1 is a schematic circuit diagram of an active matrix liquid crystal display (AMLCD) including a MIM diode drive scheme according to an embodiment of this invention.

FIG. 1 is a schematic circuit diagram of an AMLCD according to an embodiment of this invention. The AMLCD includes a plurality of pixels 1–6 arranged in a matrix array on the active substrate of the display. Pixel 1 includes liquid crystal layer 7 sandwiched between individual pixel electrode 8 and common electrode 9, as well as MIM diodes 10 and 11 which are coupled to one another and to pixel electrode 8 via common node 12. Common node 12 is in communication with each of MIM diodes 10, 11, via branches extending therefrom, as well as with pixel electrode 8. Each of the other pixels 2–6 also includes a pair of MIM diodes 10, 11 coupled at a common node 12, as well as LC material 7 sandwiched between pixel electrodes 8 and 9. The common electrode 9 in each pixel is in electrical communication with a column or data line 31, 32.

The FIG. 1 display further includes row or select lines 21–26 that are driven and selected by row select driver 27, and column or data lines 31 and 32 which are selected and driven by column driver 33. Select lines 21–26 are all substantially parallel to one another and are oriented in a first direction, while data lines 31–32 are also substantially parallel to one another, but are oriented in a second direction that is substantially orthogonal to the first direction. Thus, select lines 21–26 are substantial orthogonal to data lines 31–32 across the active matrix array.

As illustrated in FIG. 1, a pair of row or select lines is provided for each pixel, while only a single column or data line is utilized for each pixel. Although only six pixels are illustrated, it is to be understood that the AMLCD includes additional pixels as well as additional select and data address lines sufficient in number so as to form a usable image for displaying to a viewer (e.g. see FIG. 6). Each of the pixels 1–6 herein is substantially identical.

The insulator in MIM diodes 10–11 is conventionally either anodized $Ta_2O_5$ (tantalum oxide) or Si-rich $SiN_X$ (silicon nitride) grown by plasma enhanced chemical vapor deposition (CVD). [Diamond-like carbon may also be used as an insulator in MIM diodes in this invention.] $SiN_X$ diodes have steeper current voltage characteristics than $Ta_2O_5$ diodes and a lower diode capacitance. Thus, $SiN_X$ diodes are more attractive for higher resolution displays. However, $SiN_X$ diodes suffer from device degradation and spacial non-uniformity. The pixel circuits described herein thus are designed so as to have greatly increased tolerance for spacial and temporal variations of MIM diode current-voltage characteristics, as $SiN_X$ MIM diodes are preferred in certain embodiments.

A row of pixels (e.g. pixels 1 and 4) is selected by applying simultaneously opposite polarity pulses to select lines 21 and 22 while at the same time applying data voltage to the column lines in that particular row as desired. As illustrated in FIGS. 2–4, the polarity of the voltage pulses on any given select line remain constant for that line. In other words, on select line 21, for example, the polarity of pulses thereon will always be positive while the polarity of the pulses on the corresponding select line 22 will always be negative. This allows for less complex circuitry to be utilized. This is the case with all pixels disclosed herein.

Figures 4A, 4B:
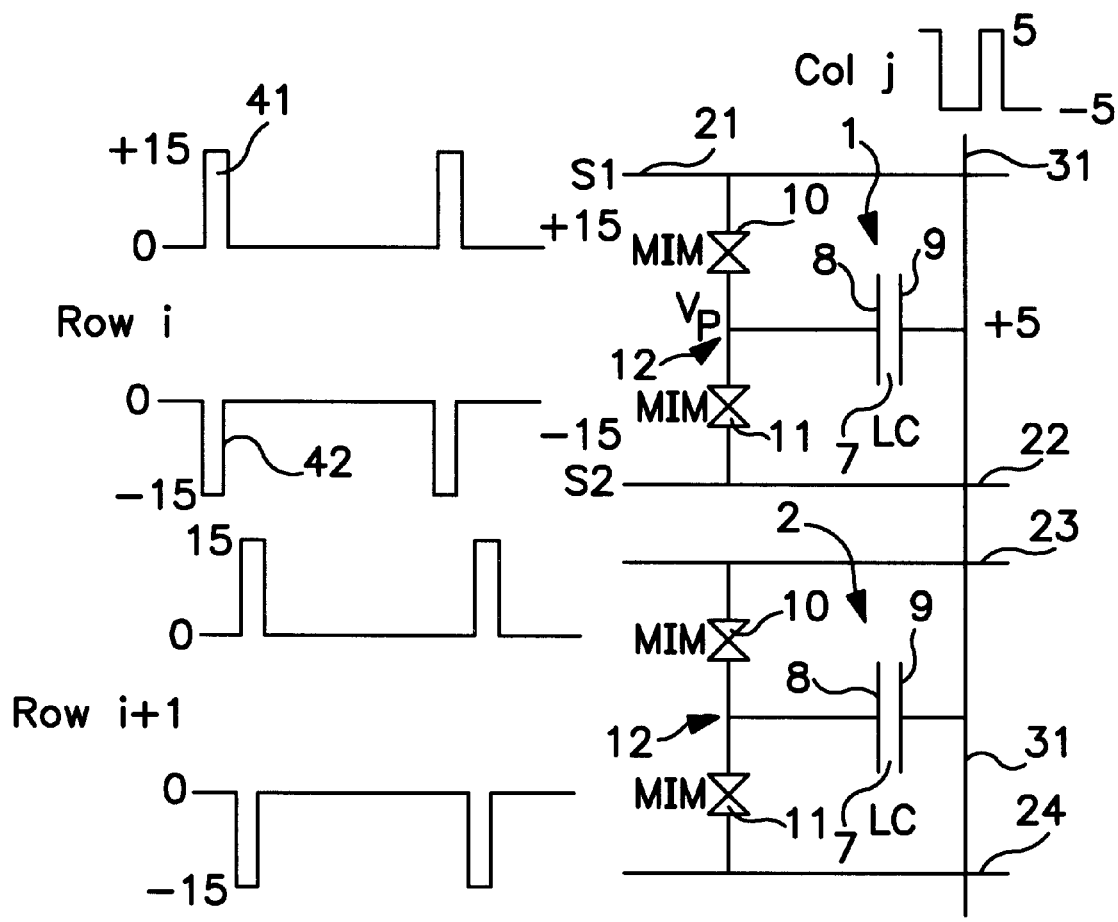
FIG. 4(a) is a circuit diagram of two pixels of FIG. 1, according to a third embodiment of this invention.
FIG. 4(b) illustrates four separate voltage v. time graphs which correspond to the select or row lines illustrated in FIG. 4(a), according to the third embodiment of this invention.

Referring now to FIGS. 1, 4(a), and 4(b), the third embodiment of this invention will first be described. Preferably, $SiN_X$ MIM diodes are utilized in this third embodiment. Two MIM diodes are connected to each LC pixel, and two separate select lines (21 and 22 for pixel 1). A row of pixels is selected by applying simultaneously opposite polarity pulses 41 and 42 of substantially equal magnitude, to the pixel, while applying data voltage to the corresponding column line 31.

Referring to prior art single MIM circuits with single row lines. Any variation in the current-voltage characteristic of the MIM device over time, with temperature, or across the display area will result in a variation of the LC voltage. In $SiN_X$ MIM diodes 10–11, the thickness and composition (i.e. Si/N ratio) of the $SiN_X$ layer determines in part the diode's current-voltage curve. Because it is difficult to control thickness and composition accurately over large area, the current voltage curve of such $SiN_X$ MIM diodes 10–11 will vary significantly across large area displays. In addition, the $SiN_X$ diode current decreases, when pulsed in the on-state for an extended period of time, leading to image retention in conventional circuits. Furthermore, because MIM current also depends on temperature, a non-uniform heating of the display will result from pixel voltage variation across the display area. Circuits herein overcome these problems.

As shown in FIGS. 4(a) and 4(b), a select voltage 41 of about 15 volts is applied to select line 21, while simultaneously a select voltage 42 of −15 volts is applied to select line 22, while a data voltage of 5 volts is applied to column or data line 31. These voltages may range from 10–30 volts for line 21, and from −10 to −30 for line 22. In the 4(a)

circuit, of pixel 1, when these signals are applied, the pixel charging saturates rapidly at the data voltage and is virtually independent of MIM current variations up to 10×. The pixel charging saturates quickly, because the voltage across each MIM device 10, 11 is still 15 volts when the pixel voltage approaches the data voltage, so that a significant on-current keeps flowing until the select pulses are switched off. The pixel voltage shift at termination of the select pulses 41 and 42 is substantially eliminated in the illustrated circuit, because the capacitive feed through voltage of diodes 10–11 substantially cancels out. When the select time is reduced to about 16 microseconds, corresponding to 1,000 rows at a 60 Hz refresh rate, the illustrated FIG. 4(a) circuit can still charge the pixel almost completely. As discussed in "A Two-diode Pixel Circuit and Addressing Method for MIM LCDs," by den Boer, October 1996, the disclosure of which is incorporated herein by reference, when the FIGS. 1 and 4(a) circuit with the illustrated drive scheme is compared with a prior art MIM diode LCD drive scheme, simulations indicate that gray scale control is superior for the FIGS. 1, 4(a) circuit and that image retention from diode degradation will be greatly reduced according to this invention. The illustrated circuit herein has increased tolerance for MIM current variations with temperature, time, and across the display area.

Still referring to FIGS. 1 and 4(a)–4(b), conventional MIM LCDs operated with a conventional drive scheme suffer from poor response times caused by the nature of the single MIM switch. As a result, it is difficult to produce video images without smearing. A worse case example of slow response time is illustrated and discussed in "A Two Diode Pixel Circuit and Addressing Method for MIM LCDs," by den Boer. The circuit of FIGS. 1 and 4(a)–4(b), is an improvement over the prior art, as with this circuit the pixel voltage reaches its new RMS value immediately, because the voltage across the MIM diodes and their current, are sufficiently large to discharge the pixel with one line time.

Still referring to FIGS. 1 and 4(a)–4(b), it has been found by the instant inventors that this invention results in less voltage variation along pixel rows than prior art MIM driven circuits. This is attributed to the faster approach of the pixel voltage to the data voltage in the inventions herein than in the prior art. In sum, circuit simulations of the circuit from FIGS. 1 and 4(a)–4(b) show that this circuit has greatly increased tolerance for spacial and temporal variations in MIM driven LCDs. This circuit also has improved response time and increased tolerance for RC delays on the row and column lines. The simulations indicate that this circuit has the potential of driving more than one thousand rows in large, low cost LCDs with diagonal size exceeding 20".

Figure 2B:
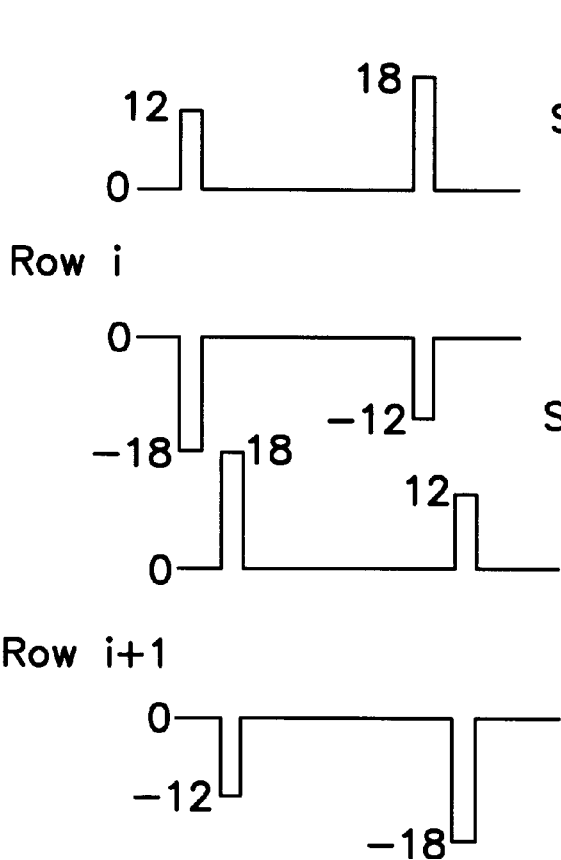
FIG. 2(b) illustrates four separate voltage v. time graphs which correspond to the four select lines illustrated in FIG. 2(a) [i.e. how these pixels are driven in operation].
Figure 2A:
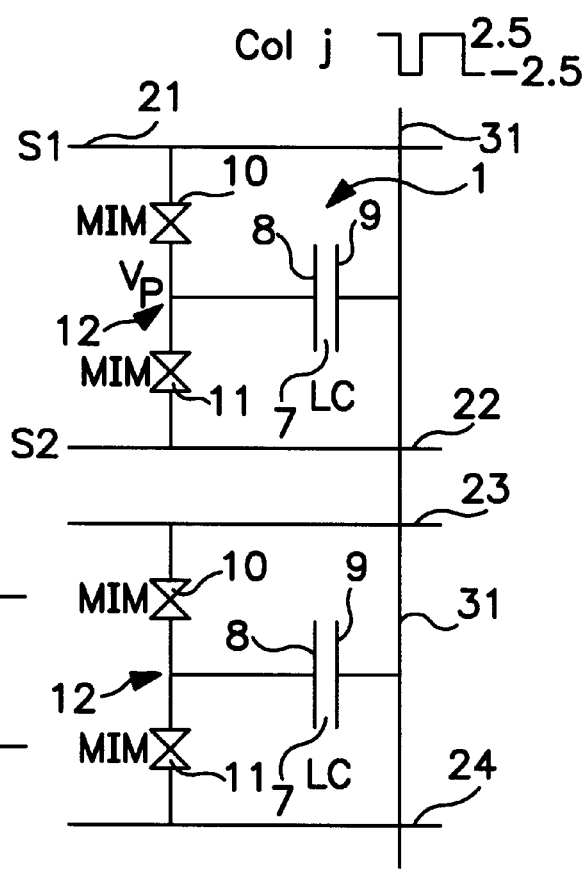
FIG. 2(a) is a circuit diagram of two different pixels of FIG. 1, on different rows, according to a first embodiment of this invention.

Referring now to the first embodiment of this invention, illustrated in FIGS. 1 and 2(a)–2(b). While the third embodiment shown in FIGS. 4(a)–4(b), when operated in a simultaneous scan mode, has numerous advantages over prior art MIM LCD technology including much improved spacial and temporal gray shade control and uniformity, faster response time, reduced image retention and cross-talk, and increased tolerance for RC delays on the row and column lines, the drawback of the FIGS. 4(a)–4(b) embodiment is that it needs to have at least a ten volt swing on the data line in order to obtain sufficient voltage across LC 7 and the relatively high voltage that can occur across MIM diodes in the off-state (during the non-select period). In the off-state, the pixel voltage can vary between +10 volts and −10 volts. At 10 volts, across the MIM diode, its current can be too high to retain sufficient charge on the pixel. Accordingly, the FIGS. 2(a)–2(b) embodiment of this invention surprisingly improves upon the FIGS. 4(a)–4(b) embodiment, by alternating the select voltage on one select line between $V_S+V_{offset}$ and $V_S-V_{offset}$ for subsequent frames, while alternating the select voltage on the other corresponding select line between $-V_S+V_{offset}$ and $-V_S-V_{offset}$. In the FIG. 2(b) example, $V_S$=15 volts and $V_{offset}$=3 volts. The data voltage swing on line 31 is thus reduced to 5 volts ($V_D$ varies between −2.5 and +2.5 volts in this example) allowing the use of low cost data drivers. $V_S$ may range from about 10–30 volts, while $V_{offset}$ may range from about 2–4 volts. Although the use of one polarity select pulse voltages per row driver keeps cost of row drivers down, and lower voltage drivers with fewer voltage levels are cheaper, it is advantageous for very large displays (e.g. 15 inch displays and greater) to have both positive and negative select lines driven from the same chip, i.e. from the same side of the display so as to cancel out the voltage drop of the select pulse amplitudes along the two row lines and prevent a DC component variation on the pixel voltage along the row line.

In this simultaneous offset scan of the FIGS. 2(a)–2(b) ripple drive embodiment, the maximum voltage across each MIM diode 10, 11 in the off-state is about 7 to 8 volts, resulting in improved charge retention in the LC 7 capacitance in each pixel. The cancellation of the pixel voltage shift from the two diodes is not complete in this drive scheme, because the opposite polarity pulses on lines 21 and 22, for example, are not of equal magnitude.

The data voltage is applied in row inversion mode [i.e. the data signal voltage polarity is charged for each row].

Still referring to the FIGS. 2(a)–2(b) embodiment, pixel 1, for example, is driven as follows. A pulse of $Vs - V_{offset}$ (e.g. 15 volts −3 volts equals 12 volts) is applied to select line 21, while a pulse of $-V_S-V_{offset}$ (e.g. −15 volts −3 volts equals −18 volts) is simultaneously applied to select line 22, while at the same time a data voltage of 2.5 volts is applied to column line 31. This charges the LC capacitance of each pixel. Because a 30 volt differential is applied between select lines 21 and 22, after each select pulsing, each node branch has a drop of 15 volts. Thus, we have −3 volts at common node 12 after the select voltage on line 21 is 12 volts and that on line 22 is −18 volts. This −3 volts at common node 12 is added to the data voltage on column line 31.

When MIM diodes 10–11 are switched off, node 12 floats and follows the column line voltage so that, for example, if −2.5 volts are applied to column line 31, the voltage at node 12 goes to −8 volts, while select line 21 and 22 are at 0 volts. Thus, the circuit enables the system to use less voltage on the column lines (this saves cost and circuit complexity), and allows less voltage variation at both node 12 and on the column lines so that there is less leakage through MIM diodes 10 and 11. Minimizing leakage through diodes 10–11 in the MIM off-state is desirable as will be appreciated by those of skill in the art.

Still referring to FIGS. 2(a)–2(b), following the frame, a voltage of $V_S+V_{offset}$ (e.g. 15 volts +3 volts equals 18 volts) is applied to select line 21, while a voltage of $-V_S+V_{offset}$ (−15 volts +3 volts equals −12 volts) is applied to select line 22, while a data voltage is applied to column line 31. Following the next frame, the signal on line 21 goes back to $V_S-V_{offset}$ and the signal on line 22 goes back to $-V_S-V_{offset}$ for the next pulsing. As discussed above, the pulsing on each of lines 21 and 22 alternate between these two values for subsequent frames when the AMLCD is on. Each pixel in the active matrix array is driven in a similar manner.

Accordingly, the FIGS. 2(a)–2(b) embodiment of this invention allows the circuit to have a smaller voltage swing on the data line (i.e. column line 31), while still obtaining sufficient voltage across liquid crystal material 7 in each pixel and limiting leakage through the MIM diodes 10–11. For example, as shown in FIG. 2(b), the voltage swing on line 31 is reduced to 5 volts (from 2.5 volts to −2.5 volts) which is an improvement over the 10 volt swing shown in FIG. 4(a). This permits the circuit to take advantage of using low cost data drivers. Still further, the FIGS. 2(a)–2(b) embodiment has a reduced number of voltage levels applied to the select lines, than does the prior art discussed in the Background Section of this application. This also allows the circuit to take advantage of less complex circuitry requirements. According to certain preferred embodiments of this invention, the voltage drop on the column or data lines is no greater than about 6 volts, preferably less than or equal to about 5 volts, while the voltage swing between corresponding select lines is no greater than about 32 volts, and is preferably less than or equal to about 30 volts.

Figure 3B:
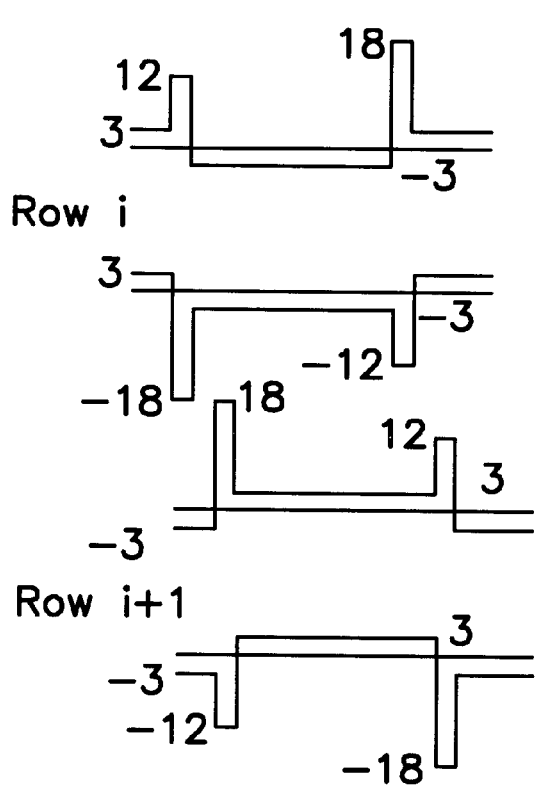
FIG. 3(b) illustrates four separate voltage v. time graphs which correspond to the four select lines in FIG. 3(a), according to the second embodiment of this invention.
Figure 3A:
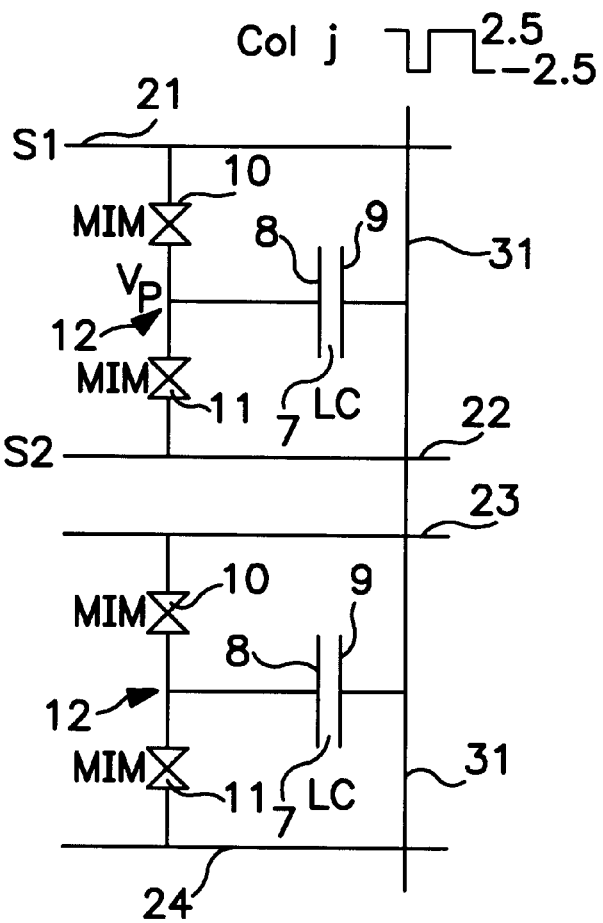
FIG. 3(a) is a circuit diagram of two different pixels of FIG. 1, on different rows, according to a second embodiment of this invention.

Referring now to the FIGS. 3(a)–3(b) embodiment of this invention, further improvement is obtained by adding holding voltages during the non-select periods, as shown in FIG. 3(b). In this simultaneous offset scan with holding voltage embodiment (i.e. the second embodiment of this invention), the maximum voltage across each MIM diode 10–11 in the off-state is further reduced to about 5 volts, improving charge retention on the LC material 7 in each pixel. The holding voltages (e.g. 3 volts or −3 volts in FIG. 3(b)) are maintained on select lines 21 and 22, respectively, until the next selection pulse. The pixel voltage shifts from the two MIM diodes 10–11 completely cancel out in this mode, because at termination of the select pulses the voltages on select lines 21 and 22 change by equal but opposite amounts. Data voltage is again applied in row inversion mode, and can stay at or below about 5 volts for low cost.

Figure 5:
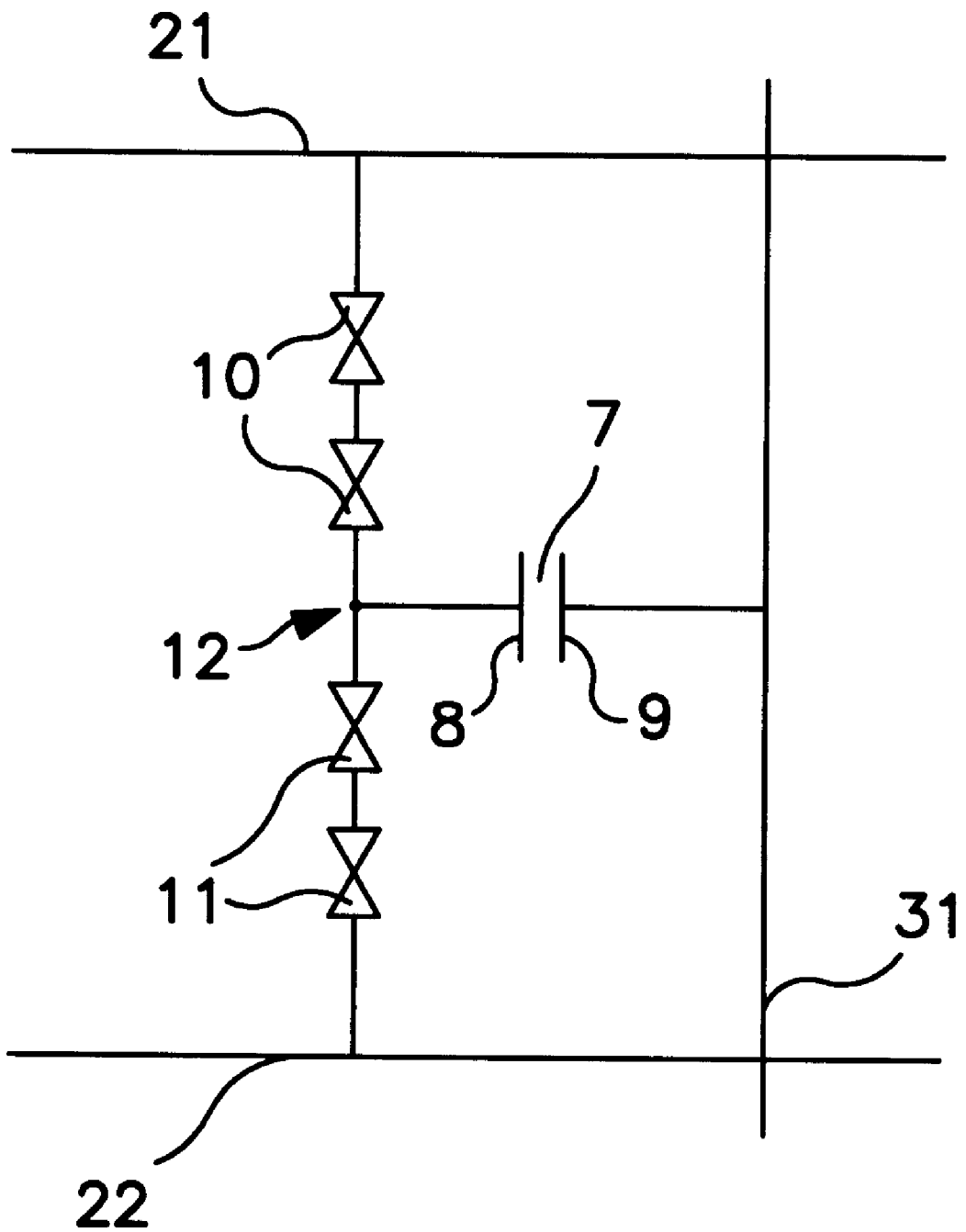
FIG. 5 is a circuit diagram of a pixel of FIG. 1, according to a fourth embodiment of this invention, wherein a pair of MIM diodes are provided on each branch (i.e. four MIMs per pixel).
Figure 6:
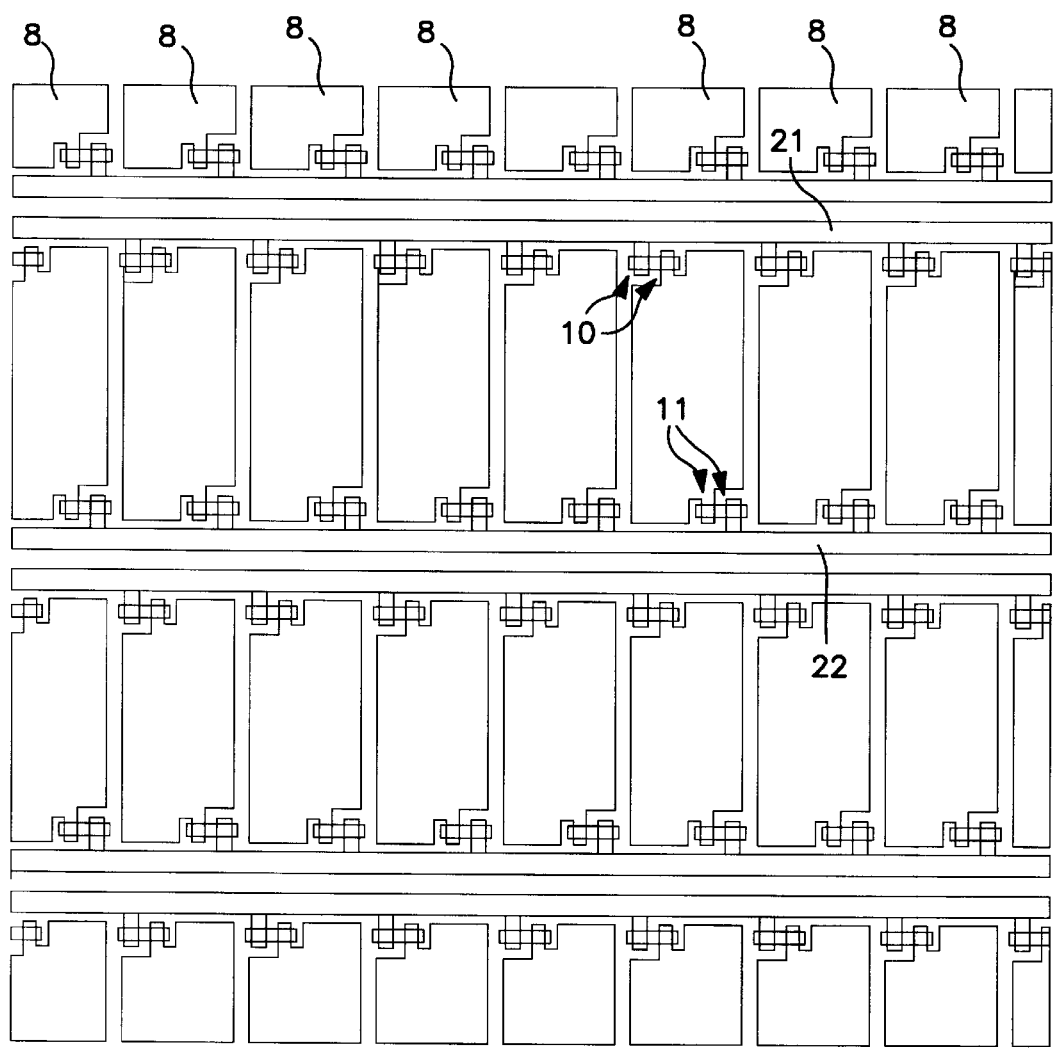
FIG. 6 is a top view of a matrix array of pixels, and corresponding MIM diodes, according to the FIG. 5 embodiment of this invention (showing the row lines and four MIMs per pixel), wherein the column of data lines on the opposite substrate are not shown.

FIGS. 5–6 illustrate a fourth embodiment of this invention, where, in contrast to the first three embodiments discussed above, a pair of separate MIM diodes are provided in each node branch. Therefore, we have four MIM diodes per pixel. This design improves the symmetrical nature of the circuit, and results in improved driving characteristics when, as discussed above, the pulse signals on each select line always have the same polarity. When using twin MIM diodes 10, 11, connected back-to-back in each branch, the pixel voltage on pixel electrode 8, and at common node 12, goes exactly to: $(V_1+V_2) \div 2$, at the end of the select time, wherein $V_1$ is the voltage pulse on line 21 and $V_2$ is the voltage pulse on line 22. This is perfectly symmetrical. FIG. 6 is a top view illustrating a matrix array of pixel electrodes 8, select lines 21, 22, and MIM diodes 10, 11, according to the FIG. 5 embodiment of this invention. This FIGS. 5–6 embodiment may use the drive schemes in any of the other embodiments of this invention (e.g. see FIGS. 2(b)–4(b)).

Each of the above discussed and/or illustrated embodiments of this invention is compatible with row inversion (e.g. FIG. 8) and frame inversion (e.g. FIG. 7) types driving schemes for LCD applications. This is in contrast to the Maeda '728 patent which, unfortunately, is limited to frame inversion applications. Additionally, the FIGS. 4(a) and 4(b) embodiment of this invention discussed above is compatible with both column inversion driving and pixel inversion driving. Center return video (e.g. 10 to 14 volt data driver) is typically used with the FIGS. 4(a)–4(b) embodiment of this invention, while bipolar video (e.g. 5 volt data driver) is typically used with the other embodiments of this invention.

FIG. 7 shows frame inversion, as all of the pixels in the display have the same polarity (+ or −) during a given frame, and the polarity of each pixel is changed for subsequent frames. Two frames, one after the other, are shown in FIG. 7. Frame inversion is undesirable in that it leads to top-to-bottom shading, cross talk, and flicker in LCD applications and is therefore almost never used. Flicker is typically defined by variation in luminance of more than a certain percentage (e.g. 5–10%) at frequency less than about 40 Hz. Because flicker can be reduced by spatial averaging, the solution to the flicker problems associated with frame inversion are row inversion, column inversion, and/or pixel inversion described below.

FIG. 8 shows an embodiment of row inversion, where one row of pixels in the display has a "+" polarity for an entire frame and another adjacent row of pixels has an opposite "−" polarity during that frame. In the FIG. 8 embodiment of row inversion, each row of pixels alternates polarity in each frame, and the polarity in each pixel changes for each frame so that if a pixel is "+" in one frame, it will be "−" in the next frame (this is the case for the illustrated embodiments of FIGS. 7–10 herein). Two frames, one after the other, are shown in FIG. 8. In the illustrated FIG. 8 embodiment of row inversion, every other row is of the same polarity so that adjacent rows in a given frame are of opposite polarity. However, in other row inversion embodiments of this invention, adjacent rows may be of the same polarity (e.g. where the first and second rows are "+", the third and fourth rows "−" the fifth and sixth rows "+" etc. In any case, row inversion reduces flicker due to spatial averaging, and reduces vertical cross talk. All MIM embodiments of this invention may be driven using these row inversion techniques, as they are preferable.

FIG. 9 illustrates column inversion, which reduces flicker and horizontal cross talk. Again, the FIGS. 4(a)–4(b) embodiment of this invention may utilize column inversion driving techniques. For column inversion, each column of pixels in the LCD has the same polarity in a given frame, and then switches polarity for the next frame. In certain embodiments, adjacent columns of pixels in a given frame have opposite polarities "+" and "−".

FIG. 10 illustrates pixel or dot inversion, which results in high image quality due to reduction in vertical and horizontal cross talk. Pixel or dot inversion is impossible with a pixel having only one MIM in it (i.e. a single MIM circuit). Pixel inversion can only be done in a pixel having at least two MIMs, such as in the instant dual MIM circuit having two select lines per pixel. Flicker is also reduced with pixel inversion. The FIGS. 4(a)–4(b) embodiment of this invention may utilized pixel or dot inversion. Again, the polarity of each pixel changes from frame to subsequent frame, and all pixels of the display in a given frame are not of the same polarity (this is also the case with row and column inversion).

The "+" and "−" signs in the FIGS. 7–10 graphs represent polarity as defined herein, where polarity is defined as the polarity of the voltage at the pixel node $V_P$ (or 12) with respect to the voltage on the opposite electrode 9 across the LC layer 7. The opposite electrodes 9 across the display are made up of patterned columns of ITO or the like to which data signals are applied. Thus, if the voltage at pixel node 12 is +5 volts and the voltage on the opposite pixel electrode 9 across the LC layer is 0 volts, then a "+" sign would be used thereby indicating that the voltage at the node 12 is greater than that at electrode 9 (it is noted that the voltage at the node 12 does not remain constant during each frame as it floats, except during select periods). In the same frame, when the voltage on the opposite pixel electrode 9 goes to e.g. +5 volts, then the voltage at the pixel node 12 would go to +10 volts, so that the relative voltage remains substantially constant throughout the entire frame and a "+" polarity at the node relative to electrode 9 is maintained for example. If the column voltage on the opposite pixel electrode 9 went to −5 volts, then the node 12 voltage would go to 0 volts. In all of these cases, the "+" sign is proper as it describes the polarity of the node 12 voltage "relative" to the opposite electrode 9 voltage. Thus, the "+" and "−" signs in FIGS. 7–10 describe the voltage across the liquid crystal material 7, in each individual pixel. In other words, the "+" and "−" signs do not describe the polarity of a particular voltage relative to zero (0), but instead describe the polarity of the node 12 voltage relative to electrode 9 across the liquid crystal layer 7.

The difference between bipolar video and center return video is as follows. In bipolar video (FIG. 20(b)), ON and OFF state of the pixel are respectively, e.g. +2.5 volts and −2.5 volts during the first frame, and −2.5 volts and +2.5 volts during the second frame, etc. The additional voltage needed to fully turn on the LC comes from biasing the node 12 between the two MIM diodes to e.g. −3 V and +3 V respectively during first and second select times. On the next row of pixels, the polarity of data for ON and OFF state and polarity for bias at the node 12 are simply reversed to obtain row inversion. However, in center return video (FIG. 20(a)), the OFF state is 0 V and the ON state is +5 V and −5 V during first and second frames, respectively, and the voltage applied to the node 12 between the MIM diodes during the select time can stay at zero at all times.

Thus, key advantage of simultaneous scan dual MIM (SSDM) LCDs of this invention over conventional MIM LCDs include improved gray shade control across the viewing area and over time. The SSDM embodiments of this invention are substantially insensitive to variations in MIM characteristics as to RC delays on rows as well as column as will be further discussed below. As an exercise in illustrating advantages SSDM LCDs of this invention (e.g. see FIGS. 1–6), circuit simulations shown in FIGS. 11 and 12 of 28 inch diagonal SVGA displays were performed.

FIG. 11 is a circuit simulation of one row of a conventional single MIM LCD, and FIG. 12 is a circuit simulation of one row of pixels of a SSDM LCD according to an embodiment of this invention. As will be illustrated below, the FIG. 12 SSDM device is superior relative to the single MIM FIG. 11 device. Certain simulation parameters used in both the FIG. 11 and FIG. 12 simulations are as follows, noting that the minimum feature size for the 240×720 μm pixel is 20 μm, much larger than the 4 to 6 μm typically used in TFT LCDs: pixel count of 600×800(×3); pixel pitch of 720×240 μm, active area of 432×576 mm; 20×20 μm MIM devices with $I_s$=3E−14A; MIM $V_c$=0.875; MIM capacitance=0.155 pF (per branch); LC capacitance (effective 0.8*Clcmax)=1.7 pF; row resistance variable from 1 to 4 kohms; row capacitance=340 pF; column resistance variable from 12 to 48 kohms; column capacitance=157 pF; drive scheme basic (FIG. 4) with all rows addressed from same side; refresh rate 60 Hz; line time 27 ps; select time 24 ps; select voltages +15 and −15 volts (V); and data voltage +/−3.5 V. FIGS. 11 and 12 show the Pspice simulation circuit for the single and dual MIM displays, respectively. Each MIM device was modeled using two antiparallel diodes with $I_s$=3E−14A (i.e. 3×10$^{-14}$):

$I=I_s[\exp(V/V_c)-\exp(-V/V_c)]$, $V_c$=0.875 V

An exponential model is a fairly good representation of the actual measured curves and is easy to implement in Pspice.

A more accurate physics/based model for the conduction mechanism is Frenkel-Poole conduction.

In FIGS. 11–12, the RC delay on the rows was modeled using a lumped circuit model, by splitting up the row line resistance in two halves with the majority of the pixels, except the first and last pixel, as a load between the two halves. The results were almost identical with distributed RC delay network with 100 resistors and 100 capacitors, and thus the lumped circuit was deemed a realistic representation of the actual circuit.

The graphs of FIGS. 13–18 were obtained from the FIGS. 11–12 simulations. FIGS. 13 and 14 show the pixel voltage of the FIG. 11 single MIM circuit and select and data waveforms with $R_{ROW}$=1 kohm, and 2 kohm respectively. FIGS. 15 and 16 show the same curves for the SSDM circuit of FIG. 12 according to embodiments of this invention. Note the differences between the single MIM graphs of FIGS. 13–14 and the dual MIM graphs of FIGS. 15–16. Meanwhile, FIG. 17 shows a three dimensional plot of the pixel voltage variation of the FIG. 11 circuit, and FIG. 18 shows a three dimensional plot of the pixel voltage variation of the FIG. 12 circuit, with each of FIGS. 17 and 18 showing pixel voltage variation across the viewing area on row and column resistance. As can be seen in the aforesaid figures, in the conventional single MIM circuit of FIG. 11, the pixel voltage variation depends linearly on the busline resistances. Even at the lowest row and column resistance simulated there is 400 mV variation. This explains why single MIM LCDs have not been reported in sizes larger than about 14 in. In the dual MIM configuration of FIG. 12 in accordance with this invention, however, there is an asymptotic dependence of the pixel voltage variation on busline resistance. Pixel voltage variation is very small, less than about 50 mV, for $R_{ROW}$<2 kohm and $R_{COLUMN}$<24 kohm.

As evident from the above and the comparison of FIGS. 11, 13, 14, and 17 with FIGS. 12, 15, 16, and 18, there are at least three significant differences between the SSDM circuit (FIGS. 12, 15, 16, 18) of this invention and the single MIM circuit (FIGS. 11, 13, 14, and 17) of the prior art. These differences include (a) saturation of pixel charging at the end of the select time, (b) pixel voltage shift at the end of the select time, and (c) final pixel voltage at the end of the select time. In all three of these aspects (a)–(c), the SSDM is superior relative to the conventional single MIM circuit.

In the single MIM conventional circuit of FIG. 11, the pixel voltage $V_{pix}$ at the end of the select time is poorly defined and the result of integration of the MIM current during the select time. The pixel charging never saturates and $V_{pix}$ is given by $V_{pix}=V_{pix,-}+^{Ts}\int_0 I_{mim}[V_{mim}(t)]dt/C_{lc}$, where $V_{pix,-}$ is the pixel voltage immediately before the select pulse, Ts is the select time, $I_{mim}$, is the MIM current which depends on the MIM voltage $V_{mim}$, and $C_{lc}$ is the capacitance of the LC or liquid crystal material in the pixel. The MIM voltage is further given by: $V_{mim}(t)=V_{select}(t)-V_{data}(t)-V_{lc}(t)$ The above two equations show that the pixel voltage $V_{pix}$, depends on the initial pixel voltage $V_{pix,-}$, on the MIM current-voltage characteristics, on Clc (which in turn depends on voltage, time and cell gap of the lc), and also on the detailed shapes of the select pulse and data pulse. In other words, select and data pulse distortion along the buslines or address lines will have a substantial effect on the pixel voltage. This is clear from the charging plots for the single MIM circuit in FIGS. 13 and 14.

However, in the SSDM (simultaneous scan dual MIM) embodiments of this invention (e.g. FIGS. 1–10, 12, 15, 16, and 18), the pixel voltage $V_{pix}$ is independent of the detailed MIM IV curves (i.e. current/voltage curves) and independent of the detailed shape of the select and data pulse, as long as pixel charging saturates. When the IV curves of the two branches in the SSDM circuit (e.g. see FIGS. 1–5 which illustrate the two MIM branches in each pixel) are equal, the pixel voltage at the end of the select time is simply given by $V_{pix}=V_{data}$ assuming that $V_{s2}=-V_{s1}$, i.e. the select pulses on the two select lines of one row are equal in magnitude and have opposite polarity. The dual MIM switch functions as an analog switch, when operated in a simultaneous select mode as illustrated herein, and transfers the data voltage exactly to the pixel, much like a TFT. Pixel charging saturates better in the dual MIM switch than in a TFT, because the switch current in the dual MIM circuit herein remains relatively high when the pixel voltage approaches the data voltage, whereas in a TFT the current goes to zero when the pixel voltage approaches the data voltage (i.e. when the source/drain voltage goes to zero). The pixel voltage shift, proportional to $C_{mim}/C_{lc}$ in the single MIM circuit, is absent in the dual MIM circuit due to cancellation of the capacitive feedthrough in the two branches.

As mentioned above, two conditions are to be satisfied in certain embodiments herein for the dual MIM switches to function as analog switches (i.e. $V_{pix}=V_{data}$) (a) the IV curves of the two branches be identical, and (b) $V_{s2}=-V_{s1}$ for each pixel along the row and column lines (not considering offset scan schemes herein). Condition (a) is met because of the proximity of the MIM diodes in the two branches of one pixel. Although a $SiN_x$ diode IV curves can vary across the display area as a result of temperature variations, $SiN_x$ thickness and composition (e.g. Si/N ratio) variations or dimensional variations in the MIM area, they can be normally assumed not to vary over a few hundred microns within a pixel. This assumption is justified because variations of temperature, $SiN_x$ thickness and composition and metal and ITO electrode widths are long range. In other words, although Frenkel-Poole conduction has a strong dependence on temperature, film thickness and film composition, variations in those parameters are canceled out in a dual MIM circuit in accordance with this invention. If there are still random variations (noise, patterning accuracy of the MIM diode, etc.), a small random DC voltage component is possible across pixels. The LC, however, is RMS responding and RMS errors are negligible for small DC errors.

Condition (b) may require the two select voltages to have equal magnitudes across the entire display. The load on the rows in the SSDM circuit has both a capacitive and a resistive component (as compared to TFT arrays, where the load is purely capacitive as long as the gate nitride is not leaky). The resistive component arises from the current flowing through the MIM diodes from the positive select line to the negative select line even when the pixel is fully charged. This effect causes a voltage drop in the select pulse amplitude along the row line. When pixel charging saturates, this voltage drop is equal for the negative and the positive select lines, so that the condition $V_{s2}=-V_{s1}$ remains satisfied. This is confirmed by the waveforms in FIGS. 15–16 where both $V_{s1}$ and $V_{s2}$ are reduced by the same amount (e.g. a few hundred mV) at the end of the row.

A row resistance of e.g. 2 kohm gives good uniformity in the 28 in. Dual MIM SVGA display and corresponds to an Al (aluminum) row busline with a width of 30 $\mu$m and a thickness of 0.3 $\mu$m. The row line metal is the last metal deposited and functions also as the top electrode for the MIM diode in the current process in certain embodiments. There are no step coverage or hillock formation issues. A thicker Al layer of e.g. 1 $\mu$m makes even larger displays feasible.

Turning now to another embodiment of this invention, it has been found that superior MIM diodes result when amorphous C:N (carbon nitride) alloy film is used as the insulator or semi-insulator of each MIM diode 10, 11. This insulator (or semi-insulator) 104 is typically located between two opposing electrodes of the TFD or MIM diode, as shown in FIG. 19(b).

We propose here the use of carbon nitride in the form of amorphous thin films (a-C:N) as the active material for a thin film diode (TFD) 10, 11. Exemplar diode structures are disclosed, for example, in U.S. Pat. No. 5,142,390, the disclosure of which is incorporated herein by reference.

A MIM or TFD diode, invented herein, including a-C:N as the semi insulator, has current voltage characteristics which are desirable for a switch in a metal-insulator-metal (MIM) LCD display or x-ray imaging device. This a-C:N alloy is a material that emulates its crystalline component beta-CN. The latter has a hardness value greater than that of diamond and is very stable to heat, light, and electrical stress.

The high field electrical conduction of a-C:N has been studied over a temperature range of 300–500K, and current is found to increase exponentially with the electric field. The exponential factor is found to increase linearly with the inverse of temperature in this range. The activation energy of the conductivity is also found to be strongly field dependent and to increase linearly with electric field.

a-C:N thin films show I-V characteristics with higher gradient than Si-rich $Si_xN_y$ of comparable thickness. a-C:N does not show any substantial photoconductivity even at light photons with energies larger than its bandgap of about 2.4 eV. This makes devices based on a-C:N insensitive to light which is desirable in display applications. The electrical relative permittivity is about 3–4. This means that MIM devices 10, 11 with larger area can be fabricated hence the use of a scanning projector for large 2D array fabrication, instead of more expensive aligners.

For satisfactory carbon nitride alloys herein, the allow may include or consist essentially of on carbon (C), nitrogen (N), and hydrogen (H). In certain satisfactory embodiments, in the alloy from about 20–60% of the atoms in the alloy are nitrogen atoms (more preferably from about 40–60%), from about 40–80% of the atoms in the alloy are carbon atoms (more preferably from about 40–60%), and when hydrogen, which is optional, is provided in the alloy from about 0–25% of the atoms in the alloy are hydrogen atoms (more preferably from about 0–15%, and most preferably from about 1–5%).

With regard to film deposition, a-C:N films with the above characteristics can be synthesized at low substrate temperatures (<100 degrees C) by two techniques: (i) growth from solid carbon, and (ii) growth from gas phase. Growth from solid carbon—sputtering of graphite targets by Ar+ ions with simultaneous low energy (e.g. from about 100–500 eV) N+ peening or assisted bombardment at ion beam densities of approximately 0.5 mA/cm$^2$. These conditions are favorable for the growth of a-C:N films with relatively high N/C atomic ratios from about 0.4 to 0.6. The use of electron energy loss spectroscopy initially shows that while the carbon was hybriseed tetrahedrally the nitrogen was sp2 hybridised giving unpolarized covalent C-N bonds. Further electron diffraction studies show that the films have a nano crystals of beta-C-N embedded in an essentially amorphous matrix. The films show hardness of about 60 Gpa and electrical resistivity of above $7\times10^{12}$ ohm-cm. In certain embodiments, the alloy has an electrical resistivity of from about $5\times10^7$ to $7\times10^{12}$. The optical bandgap was above 3 eV, and in certain embodiments the alloy's Tauc bandgap is at least about 3.0. Preferably, the alloy has a hardness of at least about 50 Gpa, and more preferably of at least about 70 Gpa.

In growth of a-C:N films from gas phase, the films can be deposited using a plasma enhanced CVD (chemical vapor deposition) method in which acetelyne and $NF_3/NH_3$ gas mixtures are introduced into a chamber via separate gas lines. The power density <500 W/m$^2$ and substrate temperature <350K. In one case, nitrogen incorporation into the carbon matrix causes a reduction in the bandgap of the carbon network.

In order to pattern thin film a-C:N, $CF_4/O_2$ as an etchant gas may be used.

FIG. 19(b) shows a TFD (e.g. MIM diode 10, 11) on substantially transparent glass substrate 101 according to an embodiment of this invention. In certain embodiments, this TFD may be a MIM diode 10, 11 wherein ax bottom electrode 102 and top electrode 103 are both of metals (e.g. Mo) while insulator or semi-insulator layer 104 disposed therebetween is of a material such as a-C:N as discussed above. In accordance with alternative embodiments, a non-metal such as indium-tin-oxide (ITO) may be used as one or both of the electrode(s) 102/103 in the diode of FIG. 19(b). In certain embodiments, the TFD includes ITO as bottom electrode 102 and Mo as top electrode 103, with either diamond-like carbon, a-C:N, or silicon rich liquid nitride as semi-insulator 104. MIM diodes are nonlinear resistance elements. In certain embodiments, the liquid crsytal is sealed between two opposing substrates on which column and row lines are formed, respectively, and the nonlinear resistance elements (e.g. MIMs) and one set of pixel electrodes are formed on the inner surface of one of the substrates 101. The other pixel electrode, opposite the pixel electrode formed on substrate 101, is formed on an opposing substrate on the other side of the LC layer as shown in U.S. Pat. Nos. 5,661,050, 5,579,139, and 5,641,974, the disclosures of which are incorporated herein by reference. The non linear resistance diodes 10, 11 are electrically connected between one of the pixel electrodes and the select lines on substrate 101. It is noted that in nonlinear resistance elements, a very small current flows even during the retention period, so that stored data is affected gradually by data signals.

In other embodiments of this invention, layer 104 of TFD (e.g. MIM diode) 10, 11 of FIG. 19(b) may be of nanocrystalline carbon, or of polycrystalline carbon. Semi-insulators of MIM or TFD diodes have typically been of $Ta_2O_5$ or PECVD grown Si-rich $SiN_x$:H. However, a drawback of these two materials is their relatively high dielectric constant values: about 23 and 8.5 respectively for $Ta_2O_5$ and $SiN_x$:H, respectively. In addition, these electronic materials, being binary and ternary alloys, are prone to issues such as spatial homogeneity and temporal degradation when used within an active device such as a diode in this case. To circumvent these problems, the simultaneous scan dual TFD or MIM [SSDM] approach shown and discussed above in FIGS. 1–10, 12, 15, 16, 18, 19(b), and 20 is/are provided in order to overcome the effects of spatial, temporal, and temperature dependent variations in TFD and MIM device characteristics. In order to efficient use of such inventions herein, I-V symmetry or symmetricity of the TFD or MIM devices 10, 11 should be good. Symmetry can be achieved by using two diodes in series per branch as shown in FIG. 5 for example. This approach however implies that the switching voltage needed per pixel is doubled and consequently is at the fringe of operability of presently available drivers. The present embodiment uses semi-insulators in the form of polycrystalline diamond and nanocrystalline carbon thin films optionally containing small amounts of N and F dopant atoms for TFD or MIM semi-insulator layer 104 [see FIG. 19(b)]. Additional desirable features of these two films include (i) low dielectric constant of less than about 4.0, preferably between about 3.0 and 4.0, which implies a lower capacitive coupling and kickback voltage; (ii) wide bandgap $E_{diamond}$ of approximately 5.3–5.7 eV, preferably aboaut 5.5 eV, and $E_{dlC}$>3 eV, which results in high transparency and virtually no photoconductivity because the density of states (DOS) is above $10^{18}$ cm$^{-3}$ eV$^{-1}$ pinning the Fermi-Level in the gap; (iii) high dielectric breakdown strength E>5×10$^6$ V cm$^{-1}$; (iv) highly symmetric I-V (current-voltage) characteristics requiring half of the switching voltage needed for Si-rich SiN. meaning that lower switching voltage is required; (v) large area and fast growth rate at room temperature which does not reduce and darken ITO; (vi) poly-crystalline diamond/carbon has a high thermal conductivity giving no thermal gradient within the film during operation, ensuring low spatial I-V variation; and (vii) chemically inert at room temperature and stable up to about approximately 250 degrees C. These advantages of the use of poly-diamond and nanocrystalline carbon films includes the fabrication of such MIM and TFD arrays using only three thin film layers and two photo-mask steps since the carbon layer can be left unpatterned. The viability of such as process coupled with the high performance of SSDM drive schemes discussed above results in promising avenues in the manufacture of AMLCDs for price competitive markets such as automotive flat panel displays. In certain embodiments, a MIM or TFD can be made by providing a substrate 101 such as glass, depositing and patterning a first electrode 102 array (e.g. strips 102 of metal or ITO) on the substrate in order to form the bottom electrodes, depositing a continuous layer of poly-crystalline diamond/carbon (or of nanocrystalline carbon) 104 on and across the substrate over the first electrode portions that have been patterned (patterning of the diamond layer 104 is optional is need not be done), and depositing and patterning a second electrode 103 array (e.g. strips 103 of metal or ITO) on the substrate. In certain embodiments, the strips 103 of top electrodes may be substantially perpendicularly aligned relative to the strips 102 of bottom electrodes, with the material 104 therebetween. In such a manner MIM or TFD devices 10, 11 can be made in accordance with this invention. MIM and TFD diodes 10, 11 herein are non-linear resistance elements, and are also bi-directional threshold devices.

FIG. 19(a) is a voltage versus current (amps) graph illustrating I-V characteristics of a carbon MIM (solid line) versus a a-Si:N MIM (dotted line). Note the low variation of voltage as a function of current for the carbon MIM diode of FIG. 19(a).

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A method of addressing an active matrix liquid crystal display, comprising the steps of:
   providing a plurality of pixels, each of the pixels including a liquid crystal layer sandwiched between first and second pixel electrodes;
   providing each pixel with first, second, third and fourth thin film MIM diodes (TFDs) of non-linear resistance that are in communication with the first pixel electrode in each pixel, each of said first and second thin film diodes including first and second opposing electrodes with a semi-insulating material provided therebetween, with the first and third MIM diodes being on one side of the common node and the second and fourth MIM diodes in each pixel being on the other side of the common node in the pixel;

providing each pixel with first and second parallel select address lines, the first select address line being in communication with the first and third thin film diode in each pixel and the second select address line being in communication with the second and fourth thin film diode in each pixel;

providing each pixel with a data address line that is in communication with the second pixel electrode in each pixel, the data address lines being perpendicular to the first and second select address lines;

coupling the first, second, third and fourth thin film diodes together at a common node, and in each pixel the liquid crystal layer and the first and second pixel electrodes being positioned electrically between the common node of the pixel and the data address line of the pixel;

in one of the pixels, (i) simultaneously in a first frame applying a first operating potential to the first select address line and a second operating potential to the second select address line, wherein the first and second operating potentials are of substantially equal magnitude but of opposite polarity relative to zero; after step (i) is performed, (ii) simultaneously in a second frame immediately following the first frame, applying a third operating potential to the first select address line and a fourth operating potential to the second select address line, wherein the third and fourth operating potentials are of substantially equal magnitude but of opposite polarity relative to zero; and after steps (i) and (ii) are performed, (iii) simultaneously in a third frame immediately following the second frame, applying a fifth operating potential to the first select address line and a sixth operating potential to the second select address line, wherein the fifth and sixth operating potentials are of substantially equal magnitude but of opposite polarity relative to zero; wherein the steps (i)–(iii) the first, third and fifth operating potentials applied to the first select address line are all of the same polarity relative to zero and the second, fourth, and sixth operating potentials applied to the second select line are of a polarity relative to zero opposite the polarity of the potentials applied to the first select line; and driving the pixels in the display using a type of inversion so that in a given frame a first group of pixels in the display is driven so that each common node in the first group of pixels has a voltage value greater than the voltage value at a corresponding pixel electrode across the liquid crystal layer therefrom in the pixel, and in said given frame a second group of pixels in the display is driven so that each common node in the second group of pixels has a voltage value less than the voltage value at a corresponding pixel electrode across the liquid crystal layer there from in the pixel.

2. The method of claim 1, wherein said steps (i)–(iii) are performed in order to bias the diodes into an on condition to facilitate the storage of charge in a capacitor in the pixel including the liquid crystal layer and the first and second pixel electrodes; and, in the pixel, applying charge to the data address line during application of the potentials of opposite polarity to the select address lines in order to store electric charge in said capacitor.

3. The method of claim 1, wherein said first, third, and fifth operating potentials are of substantially the same magnitude, and wherein said second, fourth, and sixth operating potentials are of substantially the same magnitude.

4. The method of claim 1, wherein the inversion is row inversion, whereby the first group of pixels is in a first row of pixels in the display and the second group of pixels is in a second row of pixels in the display, and wherein the first and second groups of pixels are not in the same row of a display.

5. The method of claim 1, wherein the inversion is pixel inversion.

6. A method of addressing a liquid crystal display including thin film diodes, the method comprising the steps of:

providing a plurality of pixels in the display, each of the pixels including a liquid crystal layer and first and second pixel electrodes sandwiching the liquid crystal layer therebetween so as to form a capacitor;

providing each pixel with first and second thin film diodes which are nonlinear resistance elements, said thin film diodes being coupled via a common node, the common node being located electrically between (a) the diodes, and (b) the capacitor;

wherein said first pixel electrode is located electrically between said second pixel electrode and said common node;

providing each pixel with first and second select address lines, the first select address line being coupled to the first thin film diode and the second select address line being coupled to the second thin film diode;

providing each pixel with a data address line;

in a pixel, biasing the first and second thin film diodes into an on condition to facilitate storage of charge in the capacitor of the pixel by in successive frames varying a select voltage applied to the first select address line between $V_S+V_{offset}$ and $V_S-V_{offset}$, and varying a select voltage applied to the second select address line between $-V_S+V_{offset}$ and $-V_S-V_{offset}$, wherein $V_S$ is one voltage and $V_{offset}$ is another voltage that is less than $V_S$;

driving the display via one of (a) row inversion, (b) column inversion, and (c) pixel inversion, so that in a given frame a first group of pixels in the display has a first polarity and a second group of pixels in the display has a second polarity, with the first polarity and second polarity being opposite one another; and wherein polarity is defined in view of a voltage at the common node relative to a voltage at the second pixel electrode in a particular pixel, so that in said first group of pixels in said given frame the voltage at the common node is greater than the voltage at the second pixel electrode, and in said second group of pixels in said given frame the voltage at the common node is less than the voltage at the second pixel electrode.

7. The method of claim 6, further including applying $V_S-V_{offset}$ to the first select address line and applying $-V_S-V_{offset}$ to the second select line, respectively, at the same time, and applying $V_S+V_{offset}$ to the first select line and $-V_S+V_{offset}$ to the second select line at the same time.

8. The method of claim 6, wherein all operating potentials applied to the first select line are greater than zero and all operating potentials applied to the second select line are less than zero.

9. The method of claim 6, further comprising maintaining a substantially constant voltage gap between potentials applied to the first and second select lines, in all frames.

10. The method of claim 6, further comprising the steps of: applying holding voltages to each of the first and second select lines during non-select periods in order to improve charge retention in the pixel, with the holding voltage being maintained during entire periods between select pulses until the same row is selected again, and wherein adjacent rows have opposite polarity holding voltages compatible with row inversion.

11. The method of claim 10, further comprising maintaining the holding voltages on the first and second select lines during the entire non-select period between pulses, so as to cancel out voltage shift from the first and second MIM diodes.

12. The method of claim 11, further comprising the steps of, at termination of data voltage pulses changing voltages on the first and second select lines by equal magnitude but opposite polarity amounts in order to implement the holding voltages.

13. The method of claim 6, wherein said first and second diodes are metal-insulator-metal (MIM) diodes, and the method further comprising providing each pixel with third and fourth MIM diodes so that each pixel includes four separate MIM diodes, two on each side of the common node in each pixel.

14. A pixel structure including an array of thin film diodes which are non-linear resistance elements, the structure comprising:

an array of pixels;

first and second thin film diodes, each of nonlinear resistance, in each of said pixels;

a common node in each pixel coupling together said first diode and said second diode;

each pixel including first and second parallel select lines, said first select line connected to said first diode in each pixel and said second select line connected to said second diode in each pixel;

each pixel including a data line oriented perpendicular to said first and second select lines of the pixel;

simultaneous offset scan driving means for driving the display in one of (i) a row inversion manner, and (ii) a pixel inversion manner;

the simultaneous offset scan driving means also for charging the pixel so as to supply data to a viewer of the display, said simultaneous offset scan driving means for simultaneously applying, in a first frame, a select voltage of $V_S-V_{offset}$ to said first select line and a select voltage of $-V_S-V_{offset}$ to said second select line, and thereafter simultaneously applying, in a second frame subsequent to said first frame, a select voltage of $V_S+V_{offset}$ to said first select line and a select voltage of $-V_S+V_{offset}$ to said second select line.

15. The structure of claim 14, further including means for applying a holding voltage to each of said first and second select lines between pulses, and for maintaining the holding voltage until the same row of pixels is selected again, and wherein adjacent rows of pixels in a given frame have opposite polarity holding voltages.

16. The structure of claim 14, wherein the array of pixels is in a liquid crystal display.

17. The structure of claim 14, wherein the array of pixels is in an imager.

* * * * *